US012747948B2

(12) United States Patent
Lee et al.

(10) Patent No.: US 12,747,948 B2
(45) Date of Patent: Sep. 29, 2026

(54) METHOD AND ELECTRONIC DEVICE FOR DETERMINING MISSION OF A DEVICE

(71) Applicant: AGENCY FOR DEFENSE DEVELOPMENT, Daejeon (KR)

(72) Inventors: Da Sol Lee, Daejeon (KR); Hyoung Woo Lim, Daejeon (KR); Young Il Lee, Daejeon (KR); Tok Son Choe, Daejeon (KR); Chong Hui Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/370,122

(22) Filed: Sep. 19, 2023

(65) Prior Publication Data

US 2024/0151533 A1 May 9, 2024

(30) Foreign Application Priority Data

Nov. 7, 2022 (KR) ........................ 10-2022-0147190
Jan. 11, 2023 (KR) ........................ 10-2023-0004299

(51) Int. Cl.
*G01C 21/00* (2006.01)
*G06N 3/126* (2023.01)

(52) U.S. Cl.
CPC ........... *G01C 21/005* (2013.01); *G06N 3/126* (2013.01)

(58) Field of Classification Search
CPC ...... G01C 21/005; G06N 3/126; G06N 3/086; G06N 5/01
See application file for complete search history.

(56) References Cited

U.S. PATENT DOCUMENTS 11,548,159 B1 * 1/2023 Ebrahimi Afrouzi ..... G06T 7/13
2004/0030571 A1 * 2/2004 Solomon ................ F41H 13/00 700/248

(Continued)

FOREIGN PATENT DOCUMENTS

JP 2005182806 A 7/2005
KR 101139259 B1 5/2012

(Continued)

OTHER PUBLICATIONS

Clark et al. "Flight test results for UAVs using boid guidance algorithms" Procedia Computer Science vol. 8 (2012), pp. 232-238 [ retrieved on Feb. 3, 2024] (Year: 2012).*

(Continued)

*Primary Examiner* — Emerson C Puente
*Assistant Examiner* — Alfred H B Wechselberger
(74) *Attorney, Agent, or Firm* — MILES & STOCKBRIDGE P.C.

(57) ABSTRACT

Provided is a method of determining a mission of a device in an electronic device, including identifying external situation information and status information of a plurality of devices, identifying an object function related to a degree of fitness of a device for a mission, for each set of a plurality of solutions of a first generation for the plurality of devices, calculating a value of the object function using the external situation information and the status information, based on the value, determining a set of a plurality of solutions of a next generation for the plurality of devices through a genetic algorithm (GA), and based on a first solution from a set of a plurality of solutions of a second generation by repeating the calculating the value and the determining the set of the plurality of solutions of the next generation, determining a mission for the plurality of devices.

9 Claims, 15 Drawing Sheets

(56) References Cited

U.S. PATENT DOCUMENTS

| | | | | |
|---|---|---|---|---|
| 2005/0137992 | A1 | 6/2005 | Polak | |
| 2020/0097024 | A1 | 3/2020 | Kim | |
| 2022/0066476 | A1 * | 3/2022 | Venturelli | G08G 5/0069 |
| 2022/0100184 | A1 * | 3/2022 | Natarajan | G06N 3/0499 |
| 2022/0227503 | A1 * | 7/2022 | Barnhart | G06N 3/126 |
| 2024/0249201 | A1 * | 7/2024 | Muller | G06F 18/2193 |

FOREIGN PATENT DOCUMENTS

| | | | |
|---|---|---|---|
| KR | 101152251 | B1 | 6/2012 |
| KR | 101408075 | B1 | 6/2014 |
| KR | 101462232 | B1 | 12/2014 |
| KR | 101733002 | B1 | 5/2017 |
| KR | 102203015 | B1 | 1/2021 |
| KR | 20210047056 | A | 4/2021 |
| KR | 102352375 | B1 | 1/2022 |

OTHER PUBLICATIONS

Ariff et al. "Selfish Gene Algorithm Vs Genetic Algorithm: A Review" IOP Conf. Series: Materials Science and Engineering, vol. 160 (2016); doi:10.1088/1757-899X/160/1/012098 [retrieved on Feb. 21, 2024] (Year: 2016).*

Zadeh et al. "Biogeography-based combinatorial strategy for efficient autonomous underwater vehicle motion planning and task-time management" J. Marine. Sci. Appl. vol. 15, pp. 463-477 (2016). https://doi.org/10.1007/s11804-016-1382-6 [retrieved on Feb. 3, 2024] (Year: 2016).*

Hoang et al. "An adaptive weighting mechanism for Reynolds rules-based flocking control scheme" PeerJ Comput. Sci., DOI 10.7717/peerj-cs.388 [retrieved on Feb. 3, 2024] (Year: 2021).*

Han et al. "Genetic Algorithm Based Path Planning and Dynamic Obstacle Avoidance of Mobile Robots" 1997 IEEE International Conference on Systems, Man, and Cybernetics. Computational Cybernetics and Simulation; DOI: 10.1109/ICSMC.1997.635354 [ retrieved on Feb. 3, 2024] (Year: 1997).*

Fu et al. "A Two-Layer Task Assignment Algorithm for UAV Swarm Based on Feature Weight Clustering" Hindawi, International Journal of Aerospace Engineering, vol. 2019, Article ID 3504248; DOI:https://doi.org/10.1155/2019/3504248 [retrieved on Jul. 3, 2024] (Year: 2019).*

Mesquita, R. "A Novel Path Planning Optimization Algorithm for Semi-Autonomous UAV in Bird Repellent Systems Based in Particle Swarm Optimization" [Thesis] Electrical and Computer Engineering, University Beira Interior, Portugal [retreived on Jul. 2, 2024] (Year: 2021).*

Meng et al. "Multi-mission Path Re-planning for Multiple Unmanned Aerial Vehicles Based on Unexpected Events" 2009 International Conference on Intelligent Human-Machine Systems and Cybernetics; DOI:10.1109/IHMSC.2009.113 [retrieved on Jul. 4, 2024] (Year: 2009).*

Dubey, R. "Genetic Algorithms Optimized Potential Fields for Decentralized Group Tasking" [Thesis] Computer Science and Engineering, University of Nevada, Reno [retrieved on Jul. 3, 2024] (Year: 2021).*

Ji-hoon Park et al., "Multi-mission Scheduling Optimization of UAV Using Genetic Algorithm," Journal of the Korean Society for Aeronautical Science and Flight Operation, vol. 26, No. 2, pp. 54-60 (Jun. 30, 2018).

Woohyuk Chang et al., "Autonomous Mission Management Software Design and Verification Technique for Unmanned Aerial Vehicles," Journal of The Korean Society for Aeronautical and Space Sciences, vol. 49, No. 6, pp. 505-513 (Jun. 1, 2021).

* cited by examiner

FIG. 3

| External situation information | Enemy forces identified | | | |
|---|---|---|---|---|
| 301 Response scenario : Avoidance scenario i = 0 | List of operation scenario | 1 | Rear separation | 310 |
| | | 2 | Bypass movement | 320 |
| | | 3 | Rapid movement | 330 |
| 302 Response scenario : Destruction scenario i = 1 | List of operation scenario | 1 | Attack | 340 |
| | | 2 | Reconnaissance | 350 |
| | | 3 | Standby | 360 |

FIG. 4A

| Response scenario | Condition | Condition description | Value of condition | Value of condition | Value of condition |
|---|---|---|---|---|---|
| Avoidance scenario i = 0 | 400 ~ $C_{00}$ | Whether enemy location identified | Identified 1 | Unclearly identified 0.5 | Not identified 0 |
| | 401 ~ $C_{01}$ | Position of ally forces relative to range of enemy firearms | Out of range 1 | Boundary line 0.5 | Within range 0 |
| | 402 ~ $C_{02}$ | Availability of avenue for maneuver of avoidance | Available 1 | No information 0.5 | Not available 0 |
| | 403 ~ $C_{03}$ | Whether ally forces' mobility is superior to enemy forces | Superior 1 | No information 0.5 | Not superior 0 |
| | 404 ~ $C_{04}$ | Comparison on size of ally forces and enemy forces | Enemy superior 1 | No information 0.5 | Ally forces superior 0 |
| | 405 ~ $C_{05}$ | Whether task completion time is satisfactory when avoiding | Satisfied 1 | No information 0.5 | Not satisfied 0 |
| | 406 ~ $C_{06}$ | Whether avenue for avoidance is safe when evacuating from enemy firearm range | Safe 1 | No information 0.5 | Not safe 0 |

FIG. 4B

| Response scenario | Condition | Condition description | Value of condition |
|---|---|---|---|
| Avoidance scenario i = 0 | 407 ~ $C_{07}$ | Calculate when operation scenario of device is rear separation | ※ 1) Determine 1 or 0 for each condition depending on whether condition below is satisfied. 2) Then, calculate average of total sum (range of values 0 to 1).<br>$C_{00}$ - Not identified<br>$C_{02}$ - No information / Not available<br>$C_{04}$ - Enemy superior |
| | 408 ~ $C_{08}$ | Calculate when operation scenario of device is bypass movement | ※ 1) Determine 1 or 0 for each condition depending on whether condition below is satisfied. 2) Then, calculate average of total sum (range of values 0 to 1).<br>$C_{00}$ - Identified<br>$C_{01}$ - Out of range<br>$C_{02}$ - Available<br>$C_{04}$ - Enemy superior<br>$C_{05}$ - Satisfied<br>$C_{06}$ - Safe |
| | 409 ~ $C_{09}$ | Calculate when operation scenario of device is rapid movement | ※ 1) Determine 1 or 0 for each condition depending on whether condition below is satisfied. 2) Then, calculate average of total sum (range of values 0 to 1).<br>$C_{02}$ - No information / Not available<br>$C_{03}$ - Superior<br>$C_{04}$ - Ally forces superior |

FIG. 5A

| Response scenario | Condition | Condition description | Value of condition | Value of condition | Value of condition |
|---|---|---|---|---|---|
| Destruction scenario i = 1 | 500 ～ $C_{10}$ | Whether enemy location identified | Identified 1 | No information 0.5 | Not identified 0 |
| | 501 ～ $C_{11}$ | Comparison on size of ally forces and enemy forces | Ally forces superior 1 | No information 0.5 | Enemy superior 0 |
| | 502 ～ $C_{12}$ | Position of enemy forces relative to range of ally forces firearms | Within range 1 | Boundary line 0.5 | Out of range 0 |
| | 503 ～ $C_{13}$ | Position of ally forces relative to range of enemy firearms | Out of range 1 | Boundary line 0.5 | Within range 0 |
| | 504 ～ $C_{14}$ | Whether team unit firearms is available | Possible 1 | | Impossible 0 |
| | 505 ～ $C_{15}$ | Whether team unit reconnaissance is available | Possible 1 | | Impossible 0 |
| | 506 ～ $C_{16}$ | Mobility of enemy forces | Superior 1 | No information 0.5 | Not superior 0 |

FIG. 5B

| Response scenario | Condition | Condition description | Value of condition |
|---|---|---|---|
| Destruction scenario i = 1 | 507 ~ $C_{17}$ | Calculate when operation scenario of device is attack | ※ 1) Determine 1 or 0 for each condition depending on whether condition below is satisfied. 2) Then, calculate average of total sum (range of values 0 to 1).<br>$C_{10}$ - Identified<br>$C_{11}$ - Ally forces superior<br>$C_{12}$ - Within range<br><br>@ - If firearm of device is available |
| | 508 ~ $C_{18}$ | Calculate when operation scenario of device is reconnaissance | ※ 1) Determine 1 or 0 for each condition depending on whether condition below is satisfied. 2) Then, calculate average of total sum (range of values 0 to 1).<br>$C_{10}$ - Identified<br>$C_{12}$ - Within range<br>$C_{16}$ - Not superior<br><br>@ - If firearm of device is not available<br>@ - If device is available for reconnaissance |
| | 509 ~ $C_{19}$ | Calculate when operation scenario of device is standby | ※ 1) Determine 1 or 0 for each condition depending on whether condition below is satisfied. 2) Then, calculate average of total sum (range of values 0 to 1).<br><br>@- If firearm of device is not available<br>@ - If device is not available for reconnaissance |

FIG. 6

{"image_array" : "TA_7.png", "current_date" : "2022.06.15", "current_time" : "13:54", "image_width : 640", "image_height : 480", "robot_type : UGV_O", "Heading" : -0.621", "velocity(km/h)":19.8, "Position_North" : 3902036.150 , "Position_East":473154.110, "Position_Elevation":147.570, "Mileage(km)": 89.7, "current task": 1

"robot_type : UGV_1", "Heading" : X.XXX", "velocity(km/h)":XXX, "Position_North" : XXXXXXX.XXX , "Position_East": XXXXXXX.XXX, "Position_Elevation":XXX.XXX, "Mileage(km)": XX.X, "current_task": 1

"robot_type : UGV_2", "Heading" : X.XXX", "velocity(km/h)":XXX, "Position_North" : XXXXXXX.XXX , "Position_East": XXXXXXX.XXX, "Position_Elevation":XXX.XXX, "Mileage(km)": XX.X "current_task": 2

...

"robot tripe : UAV_0", "Heading" : X.XXX", "velocity(km/h)":XXX, "Position_North" : XXXXXXX.XXX , "Position_East": XXXXXXX.XXX, "Position_Elevation":XXX.XXX, "Mileage(km)": XX.X "current_task": 0
}

610

620

630

640

650

METHOD AND ELECTRONIC DEVICE FOR DETERMINING MISSION OF A DEVICE

PRIORITY INFORMATION

This application claims the benefits of Korean Patent Application No. 10-2022-0147190 filed on Nov. 7, 2022, and Korean Patent Application No. 10-2023-0004299, filed on Jan. 11, 2023, the disclosures of which are incorporated herein by reference in their entirety.

FIELD OF THE INVENTION

The present disclosure relates to a method of determining a mission of a device and an electronic device therefor.

DESCRIPTION OF THE RELATED ART

A multi-robot system is generally composed of heterogeneous multiples, and thus characteristics of each platform are different, and there is limitation in that a small number of operating personnel perform real-time monitoring. Therefore, in order to effectively control multiple devices included in the multi-robot system, automation technology that may reduce the operators' burden is essential. The automation technology includes the failsafe function for each platform and the autonomous technology (such as environmental recognition and autonomous movement) necessary to execute tasks determined as a response to contingency in the mission assigning technology. In the future battlefield, the placement of manpower in the right places is the main factor in determining victory or defeat on the battlefield, and it may contribute to the smooth use of human resources through the minimum number of personnel to achieve the purpose.

The automation technology may be one of the main technologies emerging in the future battlefield to control the currently reduced human resources and the increasing contribution of robots and multi-robot systems in preparation for the future battlefield. However, selection for assigning a mission of existing multi-robot systems is being determined based on human intuition and experience based on the collected data. When using the genetic algorithm (GA), the search for a solution may be performed cooperatively among a plurality of entities by genetic manipulation such as selection and crossover, and thus a technology for determining a mission of a device using the GA is required. When using the convolutional deep neural network, it contributes greatly to improving accuracy in assigning a mission, and accordingly, the convolutional deep neural network is to be applied in determining and assigning missions to devices for a multi-robot system.

SUMMARY

Accordingly, the embodiments of the present invention substantially obviate one or more problems due to limitations and disadvantages of the related art.

An aspect provides a method for determining a mission of a device using the GA and an electronic device therefor. Additional features and advantages of the present disclosure will be set forth in the description which follows, and in part will be apparent from the description, or may be learned by practice of the present disclosure. The objectives and other advantages of the present disclosure will be realized and attained by the structure particularly pointed out in the written description and claims hereof as well as the appended drawings.

According to a first aspect, there is provided a method of determining a mission of a device in an electronic device, including identifying external situation information and status information of a plurality of devices, identifying an object function related to a degree of fitness of a device for a mission, for each set of a plurality of solutions of a first generation for the plurality of devices, calculating a value of the object function using the external situation information and the status information, based on the value, determining a set of a plurality of solutions of a next generation for the plurality of devices through a GA, and based on a first solution from a set of a plurality of solutions of a second generation by repeating the calculating the value and the determining the set of the plurality of solutions of the next generation, determining a mission for the plurality of devices.

According to an example embodiment, the calculating the value of the object function may include identifying a plurality of response scenarios related to the external situation information, based on a predetermined rule, calculating a plurality of degrees of fitness for the plurality of response scenarios, and based on a plurality of weights related to the plurality of response scenarios and the plurality of degrees of fitness, calculating the value of the object function.

According to an example embodiment, the calculating the plurality of degrees of fitness for the plurality of response scenarios may include calculating a degree of fitness for a first response scenario among the plurality of response scenarios, which includes, based on at least one of the external situation information and the status information, identifying whether a plurality of conditions corresponding to the first response scenario are satisfied, based on whether the plurality of conditions are satisfied, determining a first value for the plurality of conditions, and based on a plurality of first weights related to the plurality of conditions and the first value, calculating the degree of fitness for the first response scenario.

According to an example embodiment, the calculating the value of the object function based on the plurality of weights and the plurality of degrees of fitness may include, for each of the plurality of response scenarios, by performing a calculation of a function that is set based on a degree of fitness and a weight corresponding to a response scenario, determining a second value among result values of the calculation as the value of the object function.

According to an example embodiment, the set of the plurality of solutions of the first generation may include an index that is arbitrarily determined.

According to an example embodiment, the determining the set of the plurality of solutions of the next generation includes determining the set of the plurality of solutions of the next generation based on at least one of selection, crossover and mutation that are related to the GA.

According to an example embodiment, the first solution may be determined based on a frequency of the plurality of solutions of the second generation.

According to an example embodiment, the first solution may be determined based on a value of the object function for each set of the plurality of solutions of the second generation.

According to an example embodiment, the determining the mission for the plurality of devices based on the first solution may include, based on the value of the object function corresponding to the first solution, identifying a second response scenario among the plurality of response scenarios, and identifying a mission for the plurality of devices corresponding to the second response scenario by using the first solution as an index.

According to a second aspect, there is provided an electronic device of determining a mission of a device, including a transceiver, a storage configured to store at least one instruction and a processor, which is configured to identify external situation information and status information of a plurality of devices, identify an object function related to a degree of fitness of a device for a mission, for each set of a plurality of solutions of a first generation for the plurality of devices, calculate a value of the object function using the external situation information and the status information, based on the value, determine a set of a plurality of solutions of a next generation for the plurality of devices through a GA, and based on a first solution from a set of a plurality of solutions of a second generation by repeating the calculating the value and the determining the set of the plurality of solutions of the next generation, determine a mission for the plurality of devices.

According to a third aspect, there is provided a computer-readable non-transitory recording medium having a program for executing a method for determining a mission of a device on a computer, wherein the method for determining the mission of the device includes identifying external situation information and status information of a plurality of devices, identifying an object function related to a degree of fitness of a device for a mission, for each set of a plurality of solutions of a first generation for a plurality of devices, calculating a value of the object function using the external situation information and the status information, based on the value, determining a set of a plurality of solutions of a next generation for the plurality of devices through a GA, and based on a first solution from a set of a plurality of solutions of a second generation by repeating the calculating the value and the determining the set of the plurality of solutions of the next generation, determining a mission for the plurality of devices.

According to a fourth aspect, there is provided a method for operating an electronic device for assigning a mission to a robot, the method including obtaining sensed information of a plurality of robots, based on the sensed information of the plurality of robots, generating attribute information of the plurality of robots and generating image information about a terrain of a predetermined area in which at least some of the attribute information is reflected, identifying mission information that is output from a neural network into which the attribute information and the image information are input and that is for assigning a mission to a first robot among the plurality of robots, and providing the mission information.

According to an example embodiment, in the method for operating the electronic device for assigning a mission to a robot, the sensed information of the plurality of robots may be obtained from a sensor mounted on the first robot or from a sensor mounted on a separate detection robot, and the sensor mounted on the first robot may include at least one of a camera sensor, a direction detecting sensor, an accelerometer sensor, a gyro sensor, a GPS sensor, an altitude sensor and a fuel sensor.

According to an example embodiment, in the method for operating the electronic device for assigning a mission to a robot, the attribute information may include at least one of robot type information, information on robot movement direction, information on robot movement velocity, robot latitude information, robot longitude information, robot altitude information, information on robot movement distance, information on robot fuel rate, information on whether a robot is a friend or a foe, and information about a mission currently assigned to a robot.

According to an example embodiment, in the method for operating the electronic device for assigning a mission to a robot, the generating image information may include generating image information visualizing elevation of topography in grayscale, based on the image information visualizing the elevation of topography in grayscale, generating heat map information that visualizes the elevation of topography in a thermal-graphic image, identifying information about a first icon representing attributes of the plurality of robots based on at least some of the attribute information, and generating the image information about the terrain of the predetermined area by displaying the first icon on at least a part of the heat map information corresponding to location information of each robot, wherein the first icon may include at least one of an unmanned ground vehicle (UGV) icon, a rotary wing unmanned aerial vehicle (UAV) icon and a fixed wing UAV icon.

According to an example embodiment, in the method for operating the electronic device for assigning a mission to a robot, the neural network may be a convolutional neural network learned to output mission information for assigning a mission to the first robot among the plurality of robots in the predetermined area based on the attribute information of the plurality of robots in the predetermined area and the image information about the terrain of the predetermined area reflecting at least some of the attribute information of the plurality of robots in the predetermined area.

According to an example embodiment, the method for operating the electronic device for assigning a mission to a robot may further include, as input information for the neural network, obtaining the attribute information of the plurality of robots in each of the plurality of areas and image information on the terrain of each of the plurality of areas reflecting at least some of the attribute information of the plurality of robots in each of the plurality of areas, and obtaining mission information for assigning a mission to the first robot in each of the plurality of areas as target information for the input information, and training a neural network based on the input information and the target information, wherein the identifying the mission information may include identifying mission information that is output from the trained neural network in which the attribute information of the plurality of robots in the predetermined area and the image information about the terrain of the predetermined area are input.

According to an example embodiment, in the method for operating the electronic device for assigning a mission to a robot, the providing the mission information may include transmitting mission information to the first robot through a communication device or outputting the mission information on a display.

According to an example embodiment, in the method for operating the electronic device for assigning a mission to a robot, the first icon may include icons of the first robot and a second robot, and generating the image information may include, when the icons of the first robot and the second robot overlap, generating image information by reducing the size of at least one of the icons of the first robot and the second robot.

According to an example embodiment, the method for operating the electronic device for assigning a mission to a robot may further include obtaining information about military resources, wherein the identifying information about the first icon may include identifying information about a second icon representing a military resource based on information about the military resource, and wherein the generating image information may include generating image information by displaying the second icon on at least a part of the heat map information corresponding to the location information of each military resource, wherein the second icon may include at least one of an infantry icon, a tank icon, an armed vehicle icon, a truck icon, an aircraft icon, a helicopter icon, an antipersonnel mine icon, an anti-tank mine icon, an unclarified mine icon, and an overhead drops icon.

According to a fifth aspect, there is provided an electronic device for assigning a mission to a robot, including a storage configured to store at least one program and a processor, by executing the at least one program, configured to obtain sensed information of a plurality of robots, based on the sensed information of the plurality of robots, generate attribute information of the plurality of robots and generate image information about a terrain of a predetermined area in which at least some of the attribute information is reflected, identify mission information that is output from a neural network into which the attribute information and the image information are input and that is for assigning a mission to a first robot among the plurality of robots, and provide the mission information.

According to a sixth aspect, there is provided a computer-readable non-transitory recording medium having a program for executing a method of operating an electronic device to assign a mission to a robot on a computer, wherein the method includes obtaining sensed information of a plurality of robots, based on the sensed information of the plurality of robots, generating attribute information of the plurality of robots and generating image information about a terrain of a predetermined area in which at least some of the attribute information is reflected, identifying mission information that is output from a neural network into which the attribute information and the image information are input and that is for assigning a mission to a first robot among the plurality of robots, and providing the mission information.

Additional aspects of example embodiments will be set forth in part in the description which follows and, in part, will be apparent from the description, or may be learned by practice of the disclosure.

According to example embodiments, with a method of determining a mission of a device, it is possible to calculate a value of object function of each set of a plurality of solutions for a plurality of devices by using external situation information and status information of the plurality of devices, and iteratively determine a set of a plurality of solutions of a next generation for the plurality of devices through a GA. Based on a first solution of a set of a plurality of solutions of a second generation, an electronic device may quickly assign missions optimized for the plurality of devices by determining the missions for the plurality of devices.

According to example embodiments, with an electronic device, it is possible to assign a mission to a first robot among a plurality of robots by using a neural network based on attribute information of the plurality of robots and image information about a terrain of a predetermined area in which at least some of the attribute information of the plurality of robots is reflected. The electronic device simultaneously uses the attribute information of the plurality of robots and the image information about the terrain of the predetermined area in which at least some of the attribute information of the plurality of robots is reflected, and thus it is possible to provide more improved mission assigning performance. In the field of defense, the electronic device may provide improved mission assigning performance. For example, the electronic device may assign a mission more appropriate to a specific situation to an ally forces robot in a certain area.

Effects of the present disclosure are not limited to those described above, and other effects may be made apparent to those skilled in the art from the following description. Additional features and advantages of the present disclosure will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 is a diagram for explaining external situation information, a plurality of response scenarios corresponding to external situation information and operation scenarios for each of the response scenarios according to an example embodiment;

FIGS. 4A and 4B are diagrams for explaining methods of calculating a degree of fitness for an avoidance scenario when a first response scenario is the avoidance scenario based on a first value and a plurality of first weights for a plurality of conditions corresponding to the avoidance scenario;

FIGS. 5A and 5B are tables for explaining a method of calculating a degree of fitness for a destruction scenario when a first response scenario is a destruction scenario based on a first value and a plurality of first weights for a plurality of conditions corresponding to the destruction scenario;

FIG. 6 shows an example embodiment of attribute information of a plurality of robots, which is input information of a neural network;

DETAILED DESCRIPTION

Figure 1A:
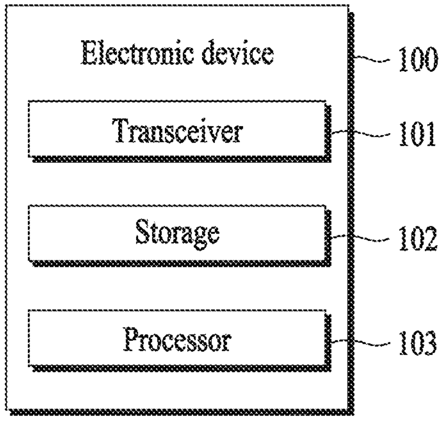
FIG. 1A is a block diagram illustrating an electronic device for determining or assigning a mission of a device according to an example embodiment.

Terms used in the example embodiments are selected from currently widely used general terms when possible while considering the functions in the present disclosure.

However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof.

Expression "at least one of a, b and c" described throughout the specification may include "a alone," "b alone," "c alone," "a and b," "a and c," "b and c" or "all of a, b and c."

In the present disclosure, a "terminal" may be implemented as, for example, a computer or a portable terminal capable of accessing a server or another terminal through a network. Here, the computer may include, for example, a notebook, a desktop computer, and/or a laptop computer which are equipped with a web browser. The portable terminal may be a wireless communication device ensuring portability and mobility, and include (but is not limited to) any type of handheld wireless communication device, for example, a tablet PC, a smartphone, a communication-based terminal such as international mobile telecommunication (IMT), code division multiple access (CDMA), W-code division multiple access (W-CDMA), long term evolution (LTE), or the like.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

In describing the example embodiments, descriptions of technical contents that are well known in the technical field to which the present disclosure pertains and that are not directly related to the present disclosure will be omitted. This is to more clearly convey the gist of the present disclosure without obscuring the gist of the present disclosure by omitting unnecessary description.

For the same reason, some elements are exaggerated, omitted or schematically illustrated in the accompanying drawings. In addition, the size of each element does not fully reflect the actual size. In each figure, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below, and may be implemented in various different forms. The example embodiments are provided only so as to render the present disclosure complete, and completely inform the scope of the present disclosure to those of ordinary skill in the art to which the present disclosure pertains. The present disclosure is only defined by the scope of the claims. Like reference numerals refer to like elements throughout.

In this case, it will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

Hereinafter, example embodiments of the present disclosure will be described in detail with reference to the accompanying drawings.

FIG. 1A is a block diagram illustrating an electronic device for determining or assigning a mission of a device according to an example embodiment.

An electronic device 100 of FIG. 1A may correspond to an electronic device of the present disclosure to be described later. The electronic device 100 of the present disclosure according to an example embodiment may include a transceiver 101, a storage 102 and a processor 103. The elements illustrated in FIG. 1A are not essential to implement an electronic device, and thus those skilled in the art understand that the electronic device 100 described herein may have more or fewer elements than those described above. In an example embodiment, the electronic device 100 may include only the storage 102 and the processor 103. Meanwhile, in an example embodiment, the processor 103 may include at least one processor.

In an example embodiment, the electronic device 100 may include the transceiver 101, the storage 102 for storing one or more instructions and the processor 103 that is configured to identify external situation information and status information of a plurality of devices, identify an object function related to a degree of fitness of a device for a mission, for each set of a plurality of solutions of a first generation for a plurality of devices, calculate a value of the object function using the external situation information and the status information, based on the value, determine a set of a plurality of solutions of a next generation for the plurality of devices through a GA, and based on a first solution from a set of a plurality of solutions of a second generation by repeating the calculating the value and the determining the set of the plurality of solutions of the next generation, determine a mission for the plurality of devices.

According to another example embodiment, the electronic device 100 may include the storage 102 for storing at least one program and the processor 103 that is configured to, by executing the at least one program, obtain sensed information of a plurality of robots, based on the sensed information of the plurality of robots, generate attribute information of the plurality of robots and generate image information about a terrain of a predetermined area in which at least some of the attribute information is reflected, identify mission information that is output from a neural network into which the attribute information and the image information are input and that is for assigning a mission to a first robot among the plurality of robots, and provide the mission information.

The transceiver 101 may communicate with an external device using a wired/wireless communication technology and may include the transceiver 101. The external device may be a client device, a terminal, an open source platform or a server. Further, the external device may include a plurality of devices or robots. Communication technologies used by the transceiver 101 may include global system for mobile communication (GSM), code division multi access (CDMA), long term evolution (LTE), 5G, wireless LAN (WLAN), wireless-fidelity (Wi-Fi), Bluetooth, radio frequency identification (RFID), infrared data association (IrDA), ZigBee and near field communication (NFC).

According to an example embodiment, the transceiver 101 may receive external situation information from an external device or a plurality of devices. Further, the transceiver 101 may receive device status information from a plurality of devices. The transceiver 101 may transmit information related to a mission for a plurality of devices to each of the plurality of devices.

The storage 102 may store information for determining a mission or information for performing a mission-assigning method, which will be described later. The storage 102 may be referred to as memory, and may be volatile memory or non-volatile memory. Further, the storage 102 may store one or more instructions required to perform the operation of the processor 103, and may temporarily store data stored on the platform or stored in an external memory. For example, the storage 102 may store external situation information, status information of a plurality of devices, information about an object function, information about a GA and information about missions of a plurality of devices.

The storage 102 is hardware that stores various data processed in the electronic device 100, and the storage 102 may store data processed by the electronic device 100 and data to process. Further, the storage 102 may store applications to be driven by the electronic device 100, drivers, and the like. The storage 102 may include random access memory (RAM), such as dynamic random access memory (DRAM), static random access memory (SRAM), read-only memory (ROM), electrically erasable programmable read-only memory (EEPROM), CD-ROM, Blu-ray or other optical disk storage, hard disk drive (HDD), solid state drive (SSD) or flash memory.

The processor 103 may control the overall operation of the electronic device 100 and process data and signals. The processor 103 may perform a mission determination or assigning method to be described later. The processor 103 may control example embodiments performed by the electronic device 100 through interaction with the transceiver 101 and the storage 102, and elements that the electronic device 100 may further include. The processor 103 may be implemented as a central processing unit (CPU), a graphics processing unit (GPU) or an application processor (AP) included in the electronic device 100. However, the processor 103 is not limited thereto.

According to an example embodiment, the processor 130 may identify external situation information and status information of a plurality of devices, identify an object function related to a degree of fitness of a device for a mission, for each set of a plurality of solutions of a first generation for a plurality of devices, calculate a value of the object function using the external situation information and the status information, based on the value, determine a set of a plurality of solutions of a next generation for the plurality of devices through a GA, and based on a first solution from a set of a plurality of solutions of a second generation by repeating the calculating the value and the determining the set of the plurality of solutions of the next generation, determine a mission for the plurality of devices.

According to an example embodiment, the processor 103 may obtain sensed information of a plurality of robots. Specifically, the sensed information of the plurality of robots may include information about an image of a robot, information of acceleration of a robot, information about velocity of each of the robots, GPS information of a robot, and information about fuel gauge of a robot. The sensed information of a robot may be measured with at least one sensor. According to an example embodiment, the at least one sensor may include a camera sensor, a direction detecting sensor, an accelerometer sensor, a gyro sensor, a GPS sensor, an altitude sensor and a fuel sensor. The sensed information and the sensors are not limited to information about the plurality of robots and the sensors. Further, the processor 103 may process the obtained sensed information of the plurality of robots to generate attribute information of the plurality of robots. Operations of generating attribute information of a plurality of robots will be described in detail with reference to FIG. 6 below.

According to an example embodiment, the sensed information of the plurality of robots may be obtained from a sensor mounted on a first robot or from a sensor mounted on a separate detection robot. Specifically, the processor 103 may obtain sensed information of the plurality of robots obtained from the sensor mounted on the first robot, and may obtain sensed information of the plurality of robots obtained from the sensor mounted on the separate detection robot. For example, the processor 103 may obtain sensed information of the plurality of robots obtained from a sensor mounted on an early warning robot. According to an example embodiment, the sensor mounted on the first robot may include at least one of a camera sensor, a direction detecting sensor, an accelerometer sensor, a gyro sensor, a GPS sensor, an altitude sensor and a fuel sensor. For example, if the camera sensor is mounted on the first robot, the processor 103 may obtain information about images of the plurality of robots obtained from the camera sensor mounted on the first robot, and if the fuel sensor is installed on the first robot, the processor 103 may obtain information about fuel gauges of the plurality of robots obtained from the fuel sensor mounted on the first robot. The sensor mounted on the first robot is not limited to the above-described sensors, or the sensor is not limited only to the sensor mounted on the first robot.

Figure 1B:
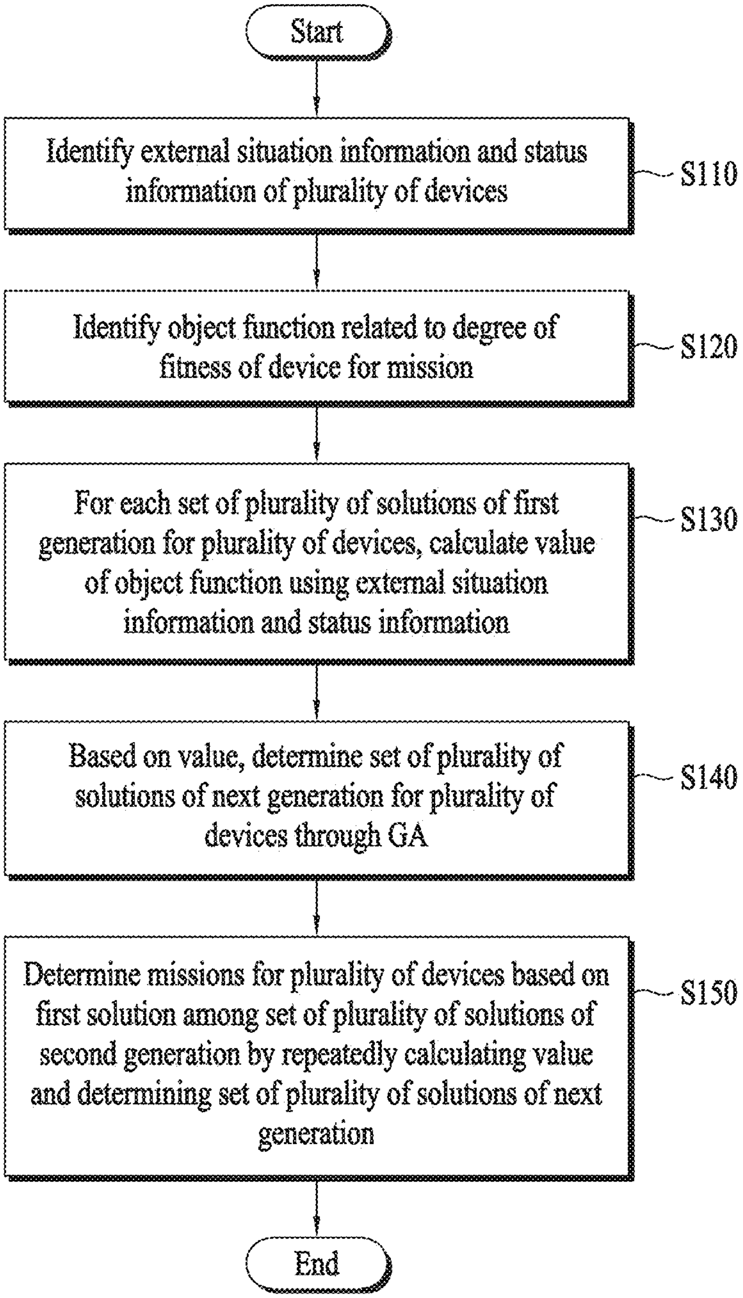
FIG. 1B is a flowchart illustrating a method in which an electronic device determines a mission of a device.

FIG. 1B is a flowchart illustrating a method in which the electronic device 100 determines a mission of a device.

Referring to FIG. 1B, may be clearly understood that for each operation in which the electronic device 100 determines a mission of a device, some operations may be changed, replace or some order among operations may be changed within the range clearly understood by those skilled in the art to which the present disclosure belongs.

According to an example embodiment, the electronic device 100 may include a transceiver, a storage for storing one or more instructions and a processor, which is configured to identify external situation information and status information of a plurality of devices, identify an object function related to a degree of fitness of a device for a mission, for each set of a plurality of solutions of a first generation for a plurality of devices, calculate a value of the object function using the external situation information and the status information, based on the value, determine a set of a plurality of solutions of a next generation for the plurality of devices through a GA, and based on a first solution from a set of a plurality of solutions of a second generation by repeating the calculating the value and the determining the set of the plurality of solutions of the next generation, determine a mission for the plurality of devices.

Here, the electronic device 100 is a device that assigns optimal missions to the plurality of devices based on external situation information and status information of the plurality of devices, and the electronic device 100 may be a device used by an operator having authority to control the plurality of devices. The electronic device 100 may be characterized by remotely assigning missions to the plurality of devices. Alternatively, the electronic device 100 may be a device operating as a master among the plurality of devices, but it is not limited thereto.

The plurality of devices may be a group of devices performing a specific mission. For example, if the specific mission is a transportation operation, the plurality of devices may include a transport helicopter, an attack helicopter and a reconnaissance helicopter. Further, the devices may be robots, but the devices are not limited thereto. For example, the devices may include civilian devices such as robots as well as military devices such as helicopters and fighter Jets.

The GA is a computational model based on the evolutionary process of the natural world, and may be an algorithmic tool used to solve optimization problems. More specifically, the GA may be an algorithm for finding a solution that optimizes an object function. In the present disclosure, the object function may be a function subject to optimization through the GA. Further, among a set of a plurality of solutions of a second generation, a first solution may be a solution resulting from optimizing an object function.

In general, the operation of determining a mission of a device in the electronic device 100 is determined based on the operator's intuition and experience based on collected data. Manual mission assignment by operators may be accompanied by many differences, such as human errors, emotional differences and differences in proficiency by operator. With respect to the differences, there may be a large difference in operational ability between an experienced person and an unskilled person. Further, fatigue and blunting of intuition from constant mission determination may also affect operational capabilities. Specifically, mission assigning, which must be provided synchronously to devices, may be difficult for both skilled and unskilled users. This may be because mission assigning is determined by the command experience of an experienced person based on data related to the current situation, rapidly changing environment and contingency. Therefore, if missions for the plurality of devices are determined based on the GA, even in an environment where an operator's skill level is low or in an environment that is rapidly changing, the electronic device 100 may assign optimal missions to the plurality of devices. Specific operations related to the mission determination will be described in detail in operation S110 to operation S150.

In operation S110, the electronic device may identify external situation information and status information of the plurality of devices.

The external situation information is information related to contingency that occurred externally, and may include external information excluding status information of a plurality of devices. For example, in case of detecting enemy forces, external situation information may be "enemy forces detected." Further, in the event of a natural disaster such as a typhoon, the external situation information may be "natural disaster occurrence." Optimum missions of a plurality of devices according to external situation information may be different, and thus the electronic device 100 needs to obtain external situation information. With regard thereto, the electronic device 100, a plurality of devices or an external device may detect an external situation. For example, if a plurality of devices or an external device detects an external situation, the electronic device 100 may receive external situation information from the plurality of devices or the external device. Alternatively, the electronic device 100 may detect an external situation. In response to the obtained external situation information, the electronic device 100 may determine missions of the plurality of devices through the GA. In other words, the contingency generated from the outside may be a trigger point for an operation in which the electronic device 100 assigns missions to the plurality of devices.

The status information may be information indicating the current status of a device at the time when an external contingency occurs. For example, the status information may include information on charging and oil status of the device at time t1 and information on whether or not the device may use a weapon for an attack, but it is not limited thereto. Further, the electronic device 100 may receive status information from each of the plurality of devices.

The device may be an object that performs a mission. For example, the device may be an UGV, an UAV and a robot, but it is not limited thereto.

In operation S120, the electronic device may identify the object function related to the degree of fitness of the device for a mission.

In operation S130, for each set of a plurality of solutions of a first generation for the plurality of devices, the electronic device may calculate a value of an object function using the external situation information and the status information.

The electronic device 100 may identify a plurality of response scenarios corresponding to the external situation information. More specifically, the plurality of response scenarios corresponding to the external situation information may be characterized in that they are set according to the propensity of the operator of the electronic device 100. Further, the plurality of response scenarios may be set differently according to the external situation information. In the present disclosure, a response scenario may be a responding method of a plurality of devices from an "overall point of view." For example, if a plurality of devices are performing transportation operations and the electronic device 100 identifies "enemy forces detected," a plurality of scenarios may include an avoidance scenario and a destruction scenario.

A solution included in a set of a plurality of solutions for a plurality of devices may include an index corresponding to an operation scenario of each of the plurality of devices. In the present disclosure, the operation scenario may be a responding method of the plurality of devices from an "individual point of view." From the point of view, the response scenario of the present disclosure may be a set of operation scenarios of each of the plurality of devices. For example, an operation scenario of each of the plurality of devices in the avoidance scenario may be rear separation, bypass movement or rapid movement.

Any one solution among the set of the plurality of solutions of the first generation may be in the form of a vector, and may be expressed as Equation 1 below.

$$A = \langle a1, a2, a3, \ldots, an \rangle \quad \text{[Equation 1]}$$

Here, the plurality of devices may be a total of n, and A may be a vector including an index corresponding to an operation scenario of each of the plurality of devices. Further, A may be characterized as vector data, which is a form to which the GA may be applied. Further, 'ai' may be an index corresponding to an operation scenario of an i-th device. For example, ai may be one of natural numbers from 1 to m, and operation scenarios corresponding to indexes from 1 to m may be different. For example, 1) when m=3 and the response scenario is avoidance scenario, an operation scenario corresponding to index 1 may be rear separation, an operation scenario corresponding to index 2 may be bypass movement, and an operation scenario corresponding to index 3 may be rapid movement. For example, 2) when m=3 and the response scenario is destruction scenario, an operation scenario corresponding to index 1 may be an attack, an operation scenario corresponding to index 2 may be reconnaissance, and an operation scenario corresponding to index 3 may be standby. m, which is the number of operation scenarios applicable to a device, may be a value that is set based on external situation information. In other words, m may be determined differently according to external situation information.

A set of a plurality of solutions for a plurality of devices may be characterized by including a plurality of vectors having the same form as A described in Equation 1. More specifically, if the population that is set in relation to the GA is 1000, a set of a plurality of solutions for a plurality of devices may include 1000 vectors having the same form as A. In the present disclosure, the set of the plurality of solutions of "the first generation" may be an initial set of a plurality of solutions for the plurality of devices. With regard thereto, an index included in a solution of the set of the plurality of solutions of "the first generation" may be arbitrarily determined. In other words, when the predetermined population is 1000, a set of a plurality of solutions for a plurality of devices may be expressed as a matrix of 1000*n, and indexes included in the set of the plurality of solutions of the first generation for the plurality of devices may be arbitrarily determined.

The object function of the present disclosure may be a function to be optimized through the GA. In other words, the electronic device 100 may search for a solution as a result of optimizing an object function through the GA. The object function of the present disclosure according to an example embodiment may be expressed as Equation 2 below.

$$\text{Fitness} = \max\{x \mid x = W_{fi} fi,\ i \text{ in } N\} \quad \text{[Equation 2]}$$

According to an example embodiment, the electronic device 100 may identify a plurality of response scenarios related to external situation information, calculate a plurality of degrees of fitness fi for the plurality of response scenarios based on a predetermined rule, and based on a plurality of weights $W_{fi}$ and a plurality of degrees of fitness fi related to the response scenarios, calculate Fitness, which is a value of the object function. More specifically, for each of the plurality of response scenarios, the electronic device 100 may perform an operation of a function that is set based on the degree of fitness fi and weight $W_{fi}$ corresponding to a response scenario and thus a second value among result values of the operation may be determined as the value of the object function. Here, the operation of the set function may be a multiplication operation of the degree of fitness and the weight. Further, the second value may be a maximum value among result values of n number of operation result values. In other words, for $W_{fi}$fi with the maximum value among the result values of n number of operations, if i maximizing the value is j, the j-th response scenario is a response scenario of a plurality of devices for external situation information and may be the fittest response scenario.

There may be a total of n number of response scenarios ranging from 1 to n for the plurality of response scenarios corresponding to contingency. Here, fi may be the degree of fitness for the i-th response scenario. In other words, fi may be a value digitizing the degree to which the i-th response scenario is suitable for resolving external contingency. Further, $W_{fi}$ is a weight corresponding to the i-th response scenario, and may be characterized in that it is variably set based on the propensity of the operator. For example, when detecting enemy forces, an operator who prefers the avoidance scenario to the destruction scenario may set higher weight for the avoidance scenario. With regard thereto, $W_{fi}$ is a value that is set for each of contingency and response scenario, and may be characterized in that it is designed to have a maximum value of 1. Further, the difference in $W_{fi}$ for each response scenario may be limited to a maximum of 3 times. Here, the 3 times is a mere example, and the difference in $W_{fi}$ for each response scenario may be changed by the operator of the electronic device 100.

In other words, weight may be set differently for each response scenario, and a mission finally assigned to a plurality of devices may be optimized based on the propensity of the operator of the electronic device 100.

The method of calculating fi, which is the degree of fitness for the i-th response scenario, may be expressed as Equation 3 below.

$$f_i = \sum_j w_{c_{ij}} c_{ij} \quad \text{[Equation 3]}$$

According to an example embodiment, the electronic device 100 may identify whether a plurality of conditions corresponding to the first response scenario are satisfied based on at least one of external situation information and status information, the electronic device 100 may determine $c_{ij}$ as a first value for the plurality of conditions based on whether the plurality of conditions are satisfied, and the electronic device 100 may calculate fi, which is a degree of fitness for the first response scenario based on a plurality of first weights $w_{c_{ij}}$ related to the plurality of conditions and the first value ci.

Here, fi, which is the degree of the fitness for the i-th response scenario, may be expressed as a weighted sum for $c_{ij}$, which is a first value of the plurality of conditions. Further, conditions corresponding to the i-th response scenario may range from 1 to r, and the type and number of conditions corresponding to each response scenario may be different. Here, $c_{ij}$ may be a value determined differently depending on whether conditions are satisfied. More specifically, 1) if the conditions are satisfied, $c_{ij}$ may be determined with value 1, 2) if it is not identified whether the conditions are satisfied or not, $c_{ij}$ may be determined with value 0.5, and 3) if the conditions are not satisfied, $c_{ij}$ may be determined with value 0. However, vales 1, 0.5 and 0 are mere examples, and the value of $c_{ij}$ is not limited thereto.

Further, $w_{c_{ij}}$ is a weight for a condition, and may be characterized in that it is set variably based on an operator's propensity. More specifically, $w_{c_{ij}}$ is a value that is set for each of contingency, response scenario and condition, and may be characterized in that the sum of $w_{c_{ij}}$ from j=1 to r is designed to be 1. Further, the difference in $w_{c_{ij}}$ for each condition may be limited to a maximum of 3 times. Here, 3 times is a mere example, and the difference in $w_{c_{ij}}$ for each condition may be changed by the operator of the electronic device 100.

In other words, a weight may be set differently for each condition, and a mission finally assigned to a plurality of devices may be optimized based on the propensity of an operator of the electronic device 100.

In operation S140, based on a value, the electronic device may determine a set of a plurality of solutions of a next generation for the plurality of devices through the GA.

According to an example embodiment, based on the values of the object function for each of the set of the plurality of solutions, the electronic device 100 may determine a set of the plurality of solutions of the next generation for a plurality of devices through the GA. More specifically, the electronic device 100 may determine a set of a plurality of solutions of the next generation based on at least one of selection, crossover and mutation that are related to the GA.

For example, 1) when determining a set of a plurality of solutions of the next generation based on selection from the GA, the electronic device 100 may replace a solution having a smaller object function value with a solution having a greater object function value, among the two solutions that are randomly selected. For example, 2) when determining a set of a plurality of solutions of the next generation based on crossover from the GA, the electronic device 100 may randomly select two solutions according to a probability related to crossover, and a new solution may be generated by changing an arbitrary interval of the two solutions. For example, 3) when determining a set of a plurality of solutions of the next generation based on mutation from the GA, the electronic device 100 may randomly select a solution according to the probability related to the mutation, and may generate a new solution by changing the arbitrary two indices included in the solution. Further, the electronic device 100 may simultaneously use two or more processes of selection, crossover and mutation related to the GA to determine a set of a plurality of solutions of the next generation.

In operation S150, the electronic device may determine missions for a plurality of devices based on a first solution among a set of a plurality of solutions of a second generation by repeatedly calculating a value and determining a set of a plurality of solutions of the next generation.

Based on the generation set in relation to the GA, the electronic device 100 may repeatedly perform calculating a value in operation S130 and determining a set of a plurality of solutions of a next generation in operation S140. For example, if the generation that is set in relation to the GA is 100, the electronic device 100 may repeatedly perform the calculating a value in operation S130 and the determining a set of a plurality of solutions of the next generation in operation S140 100 times. With regard thereto, a set of a plurality of solutions of "the second generation" of the present disclosure may be a set of a plurality of solutions of "a last generation" for the plurality of devices after the calculating the value of operation S130 and the determining the set of a plurality of solutions of the next generation of operation S140 are repeated as many times as the generation that is set in relation to the GA.

More specifically, a set of a plurality of solutions corresponding to a plurality of devices may be characterized in that it continuously changes as an optimization process progresses through the GA based on a value of an object function. The set of a plurality of solutions of a second generation may be a final set of a plurality of solutions for the plurality of devices after the operations are repeated as many times as the number of the generation that is set in relation to the GA. Specifically, among the set of a plurality of solutions of the second generation, a first solution may be an optimal solution of the plurality of devices identified through the GA. For example, 1) the first solution may be determined based on the frequency of the plurality of solutions of the second generation. More specifically, the first solution may be a solution with the highest frequency among the plurality of solutions of the second generation. For example, 2) the first solution may be determined based on a value of the object function for each set of a plurality of solutions of the second generation. More specifically, the first solution may be a solution corresponding to a maximum value among object function values for each set of the plurality of solutions of the second generation.

According to an example embodiment, the electronic device 100 may identify a second response scenario among a plurality of response scenarios based on the value of the object function corresponding to the first solution. For example, the second response scenario may be a scenario in which a value of an object function is maximized among the plurality of response scenarios. Further, the electronic device 100 may identify missions for a plurality of devices corresponding to the second response scenario by using the first solution as an index. For example, if the second response scenario is avoidance and the indexes included in the first solution are 1, 2 and 3, the missions of the plurality of devices may be rear separation, bypass movement and rapid movement, respectively. In the present disclosure, a mission determined for each device may be an operation scenario corresponding to the first solution, which is an optimal solution for the plurality of devices.

As such, since the electronic device 100 determines missions for a plurality of devices using the GA, the plurality of devices may receive information about the missions from the electronic device and respond effectively to contingency.

Figure 2:
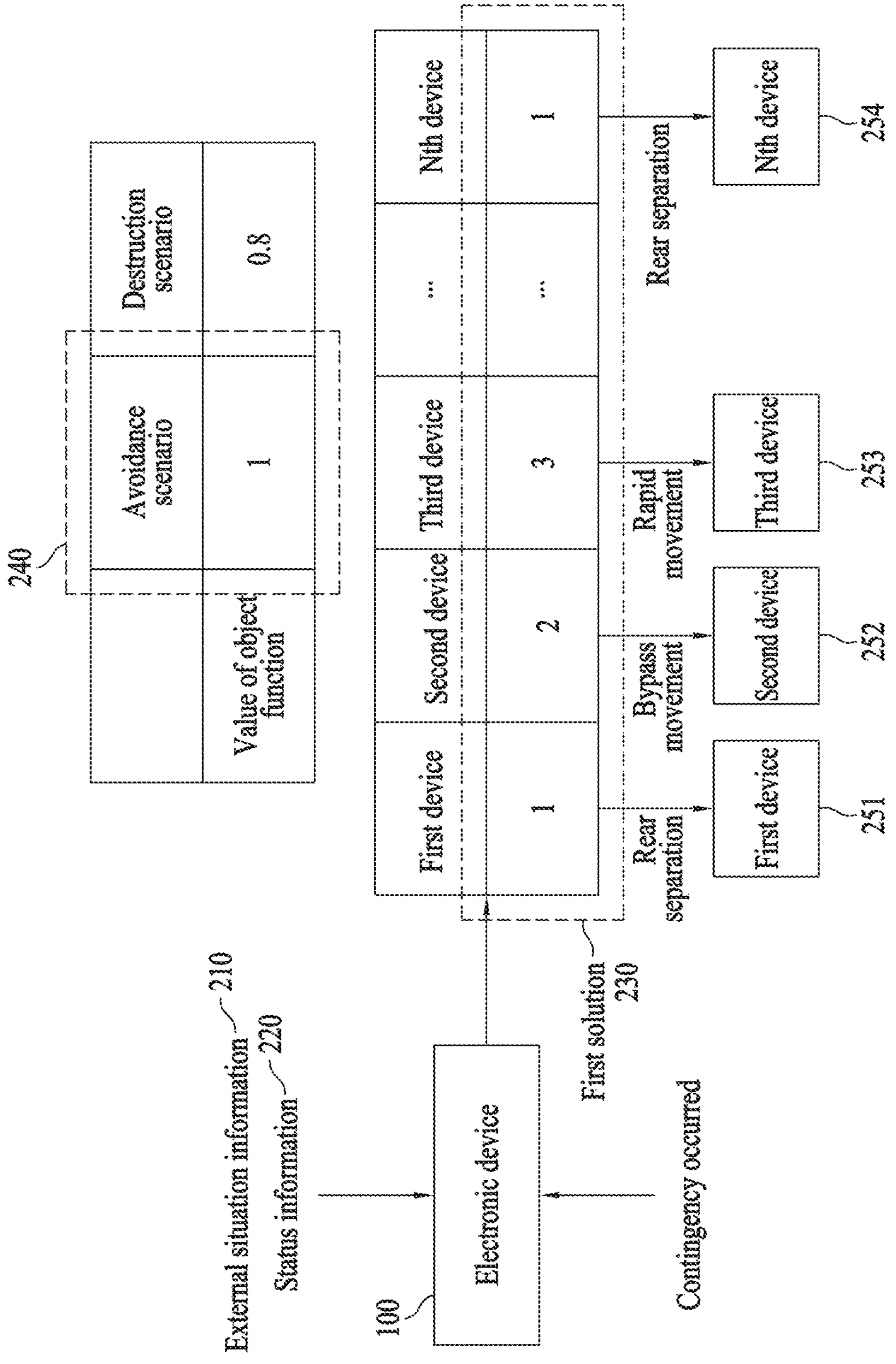
FIG. 2 is a diagram for explaining a method for an electronic device to determine missions of devices according to an example embodiment.

FIG. 2 is a diagram for explaining a method for an electronic device to determine missions of devices according to an example embodiment.

Referring to FIG. 2, a system for determining the mission of a device may include the electronic device 100 and a plurality of devices. FIG. 2 illustrates a first device 251, a second device 252, a third device 253 and an n-th device 254 among the plurality of devices.

While the plurality of devices are performing specific missions, contingency may occur from the outside. Here, the electronic device 100 may receive external situation information from a plurality of devices or other external devices, or the electronic device 100 may directly sense an external environment. Accordingly, the electronic device 100 may identify external situation information 210. For example, the identified external situation information 210 may be information "enemy forces detected." Here, the contingency generated from the outside may be a trigger point for an operation in which the electronic device 100 assigns missions to the plurality of devices. With regard thereto, in order to assign missions to the plurality of devices, the electronic device 100 may receive status information 220 from the plurality of devices. For example, the received status information may include information on the remaining flow rate of the plurality of devices, information on whether attack weapons may be used, and so on.

The electronic device 100 may calculate a value of an object function for each set of a plurality of solutions for the plurality of devices by using the external situation information 210 and the status information 220. The electronic device 100 may determine a set of a plurality of solutions of a next generation for the plurality of devices through the GA based on the value of the object function. The electronic device 100 may identify a set of a plurality of solutions of a second generation according to iteratively calculating the value of the object function and determining the set of a plurality of solutions of the next generation for the plurality of devices through the GA.

More specifically, among the set of a plurality of solutions of the second generation, a first solution 230 may be an optimal solution of the plurality of devices identified through the GA. For example, the first solution 230 may include an index corresponding to each mission of the plurality of devices. Referring to FIG. 2, among indices included in the first solution 230, an index corresponding to the first device 251 may be 1, among the indices included in the first solution 230, an index corresponding to the second device 252 may be 2, and among the indices included in the first solution 230, an index corresponding to the third device 253 may be 3, and further an index corresponding to the n-th device 254 may be 1.

According to an example embodiment, the electronic device 100 may identify a second response scenario among the plurality of response scenarios based on the value of the object function corresponding to the first solution 230. For example, the second response scenario may be a scenario in which a value of an object function is maximized among the plurality of response scenarios. Referring to FIG. 2, the value of the object function of an avoidance scenario 240 is greater than the value of the object function of the destruction scenario, and thus a scenario that maximizes the value of the object function among the plurality of response scenarios may be the avoidance scenario 240. In other words, among a plurality of response scenarios, the second response scenario may be the avoidance scenario 240.

Further, the electronic device 100 may identify missions for the plurality of devices corresponding to the second response scenario by using the first solution 230 as an index. For example, for the avoidance scenario 240, a mission corresponding to index 1 may be rear separation, a mission corresponding to index 2 may be bypass movement, and a mission corresponding to index 3 may be rapid movement. In other words, the electronic device 100 may determine "the avoidance scenario" to be a response scenario for the plurality of devices and simultaneously determine a mission for each of the plurality of devices. Referring to FIG. 2, the electronic device 100 may determine rear separation to be the mission of the first device 251. The electronic device 100 may determine bypass movement to be the mission of the second device 252. The electronic device 100 may determine rapid movement to be the mission of the third device 253. The electronic device 100 may determine rear separation to be the mission of the n-th device 254.

FIG. 3 is a diagram for explaining external situation information, a plurality of response scenarios corresponding to external situation information and operation scenarios for each of the response scenarios according to an example embodiment.

According to an example embodiment, it may be characterized that a plurality of response scenarios corresponding to the external situation information are set according to propensity of an operator. Referring to FIG. 3, when the external situation information is "enemy forces detected," a plurality of response scenarios corresponding to the external situation information may include an avoidance scenario 301 and a destruction scenario 302. However, the response scenario is not limited thereto. Further, an operator of the electronic device 100 may add a response scenario corresponding to external situation information.

For example, the plurality of devices may include a first device, a second device and a third device. Here, if any solution among the set of a plurality of solutions for the plurality of devices is {1, 2, 3}, 1) operation scenarios of the plurality of devices in the avoidance scenario in which i=0 may be rear separation 310, bypass movement 320 and rapid movement 330, and 2) operation scenarios of the plurality of devices in the destruction scenario in which i=1 may be attack 340, reconnaissance 350 and standby 360. According to the paragraphs on Equation 2, the electronic device 100 may determine the value of the object function for {1, 2, 3} by calculating $w_{f_0}f_0$ in the avoidance scenario and $w_{f_1}f_1$ in the destruction scenario. Further, $w_{f_0}$ and $w_{f_1}$ may be weights set by an operator of the electronic device 100. Further, the degree of fitness for response scenarios such as $f_0$ and $f_i$ may be calculated according to the method described in the paragraphs about Equation 3. With FIGS. 4A and 4B, a method for determining $f_0$, which is the degree of fitness for the avoidance scenario in which i=0, will be described. With FIGS. 5A and 5B, a detailed method of determining $f_1$, which is the degree of fitness for the destruction scenario in which i=1, will be described.

FIGS. 4A and 4B are diagrams for explaining methods of calculating a degree of fitness for an avoidance scenario when a first response scenario is the avoidance scenario based on a first value and a plurality of first weights for a plurality of conditions corresponding to the avoidance scenario.

According to an example embodiment, the electronic device 100 may identify whether a plurality of conditions corresponding to the first response scenario are satisfied based on at least one of external situation information and status information, determine a first value for the plurality of conditions based on whether the plurality of conditions are satisfied, and calculate a degree of fitness for a first response scenario based on a plurality of first weights related to the plurality of conditions and the first value.

Referring to FIGS. 4A and 4B, when the first response scenario is the avoidance scenario, the plurality of conditions corresponding to the first response scenario are $C_{00}$ 400, $C_{01}$ 401, $C_{02}$ 402, $C_{03}$ 403, $C_{04}$ 404, $C_{05}$ 405, $C_{06}$ 406, $C_{07}$ 407, $C_{08}$ 408 and $C_{09}$ 409. The electronic device 100 may determine the first value for the plurality of conditions by identifying whether each of the plurality of conditions is satisfied based on at least one of the external situation information and the status information of the devices.

For example, $C_{03}$ 403 may be a condition for whether the mobility of the ally forces is superior to the mobility of enemy forces. The electronic device 100 may determine the value of $C_{03}$ 403 according to whether the condition of $C_{03}$ 403 is satisfied by the electronic device 100 comparing the external situation information including velocity information of detected enemy forces with device status information including velocity information of the ally forces. For example, 1) when the mobility of the ally forces is superior to that of the enemy forces, the degree of fitness for the avoidance scenario may need to be increased. In other words, the value of $C_{03}$ 403 may be 1. For example, 2) if it is impossible to determine whether the condition of $C_{03}$ 403 is satisfied based on the external situation information or the status information of the devices, the value of $C_{03}$ 403 may be 0.5. For example, 3) when the mobility of the ally forces is not superior to that of the enemy forces, the degree of fitness for the avoidance scenario may need to be decreased. In other words, the value of $C_{03}$ 403 may be 0. The values of conditions corresponding to $C_{00}$ 400, $C_{01}$ 401, $C_{02}$ 402, $C_{04}$ 404, $C_{05}$ 405 and $C_{06}$ 406 are calculated according to a method similar to the example embodiment with regard to $C_{03}$ 403 described above.

$C_{00}$ 400, $C_{01}$ 401, $C_{02}$ 402, $C_{03}$ 403, $C_{04}$ 404, $C_{05}$ 405 and $C_{06}$ 406 may be conditions whose values are determined depending on whether or not a condition is satisfied in the "overall view" of the plurality of devices. Differently therefrom, $C_{07}$ 407, $C_{08}$ 408 and $C_{09}$ 409 may be conditions selectively calculated based on operation scenarios of each of the plurality of devices. For example, as illustrated in FIG. 3, if the solution is {1, 2, 3}, an operation scenario of the plurality of devices may be rear separation, bypass movement and rapid movement. Here, $C_{07}$ 407, $C_{08}$ 408 and $C_{09}$ 409 may be calculated respectively.

For example, $C_{07}$ 407 may be calculated when the operation scenario of the device is rear separation. For example, if the condition of $C_{00}$ 400 is "Unidentified," the condition of $C_{02}$ 402 is "No information" and the condition of $C_{04}$ 404 is "Ally forces superior," the value of $C_{07}$ 407 may be determined as ⅔. Values of conditions corresponding to $C_{08}$ 408 and $C_{09}$ 409 may be calculated according to a method similar to the example embodiment with regard to $C_{07}$ 407 described above.

Further, the electronic device 100 may identify a plurality of first weights related to the plurality of conditions. $w_{c_{ij}}$, a plurality of first weighs, is a value that is set for each of contingency, response scenario and condition. The sum of $W_{c_{00}}$, $W_{c_{01}}$, $W_{C_{02}}$, $W_{c_{03}}$, $W_{c_{04}}$, $W_{c_{05}}$, $W_{C_{06}}$, $W_{c_{07}}$, $W_{C_{08}}$ and $W_{C_{09}}$ may be 1. A default value of $w_{c_{ij}}$, which is the plurality of first weights, may be 1/the number of the plurality of conditions. In other words, a default value of $w_{c_{ij}}$, which is the plurality of first weights in FIGS. 4A and 4B, may be 0.1.

The electronic device 100 may calculate a degree of fitness for the avoidance scenario based on the first value and the plurality of first weights for the plurality of conditions.

FIGS. 5A and 5B are tables for explaining a method of calculating a degree of fitness for a destruction scenario when a first response scenario is the destruction scenario based on a first value and a plurality of first weights for the plurality of conditions corresponding to the destruction scenario.

According to an example embodiment, the electronic device 100 may identify whether the plurality of conditions corresponding to the first response scenario are satisfied based on at least one of external situation information and status information, determine a first value for the plurality of conditions based on whether the plurality of conditions are satisfied, and may calculate a degree of fitness for a first response scenario based on a plurality of first weights related to the plurality of conditions and the first value.

Referring to FIGS. 5A and 5B, when the first response scenario is the destruction scenario, the plurality of conditions corresponding to the first response scenario may include $C_{10}$ 500, $C_{11}$ 501, $C_{12}$ 502, $C_{13}$ 503, $C_{14}$ 504, $C_{15}$ 505, $C_{16}$ 506, $C_{17}$ 507, $C_{18}$ 508 and $C_{19}$ 509. The electronic device 100 may determine a first value for the plurality of conditions by identifying whether each of the plurality of conditions is satisfied based on at least one of the external situation information and the status information of the devices.

For example, $C_{13}$ 503 may be a condition for the position of the plurality of the ally forces relative to the firearm range of the enemy forces. The electronic device 100 may determine the value of $C_{13}$ 503 according to whether the condition of $C_{13}$ 503 is satisfied by comparing the external situation information including the range information of detected enemy forces firearms with the status information of the devices including location information of the ally forces. For example, 1) when the ally forces are located within the firearm range of the enemy forces, the degree of fitness for the destruction scenario may need to be increased. In other words, the value of $C_{13}$ 503 may be 1. For example, 2) the value of $C_{13}$ 503 may be 0.5 when the ally forces is located near the boundary of the enemy forces' firearm range. For example, 3) the value of $C_{13}$ 503 may be 0 when the ally forces is located outside the firearm range of the enemy forces. The values of conditions corresponding to $C_{10}$ 500, $C_{11}$ 501, $C_{12}$ 502, $C_{14}$ 504, $C_{15}$ 505 and $C_{16}$ 506 may be calculated according to a method similar to the example embodiment with regard to $C_{13}$ 503 described above.

$C_{10}$ 500, $C_{11}$ 501, $C_{12}$ 502, $C_{13}$ 503, $C_{14}$ 504, $C_{15}$ 505 and $C_{16}$ 506 may be conditions whose values are determined depending on whether or not the condition is satisfied in the "overall view" of the plurality of devices. Unlike the conditions, $C_{17}$ 507, $C_{18}$ 508 and $C_{19}$ 509 may be conditions characterized in being selectively calculated based on the operation scenarios of each of the plurality of devices. For example, as illustrated in FIG. 3, if the solution is {1, 2, 3}, operation scenarios of the plurality of devices may be attack, reconnaissance and standby. $C_{17}$ 507, $C_{18}$ 508 and $C_{19}$ 509 may be calculated respectively.

For example, $C_{18}$ 508 may be characterized in being calculated when the operation scenario of the devices is reconnaissance. For example, if the condition of $C_{10}$ 500 is "Identified" and the condition of $C_{12}$ 502 is "Out of range," if the condition of $C_{16}$ 506 is "Not superior" and device firearms may not be used, and if the devices are available for reconnaissance, a first value corresponding to $C_{18}$ 508 may be determined to be 0.8. Values of conditions corresponding to $C_{17}$ 507 and $C_{19}$ 509 may be calculated according to a method similar to the example embodiment with regard to $C_{18}$ 508.

Further, the electronic device 100 may identify a plurality of first weights related to the plurality of conditions. $w_{c_{ij}}$, a plurality of first weights, is a value that is set for each of contingency, response scenario and condition. The sum of $W_{c_{10}}$, $W_{c_{11}}$, $W_{c_{12}}$, $W_{c_{13}}$, $W_{c_{14}}$, $W_{c_{15}}$, $W_{c_{16}}$, $W_{c_{17}}$, $W_{c_{18}}$ and $W_{c_{19}}$ may be 1. A default value of $w_{c_{ij}}$, which is the plurality of first weights, may be 1/the number of the plurality of conditions. In other words, a default value of $w_{c_{ij}}$, which is a plurality of first weights in FIGS. 5A and 5B, may be 0.1.

The electronic device 100 may calculate the degree of fitness for the destruction scenario based on the first value and the plurality of first weights for the plurality of conditions.

Mission assignment, which must be provided synchronously to multiple robots, is difficult for both skilled and unskilled users. This is because missions being assigned may be changed according to people's emotions and situations, depending on the command experience of an experienced person based on data such as the current situation, rapidly changing environment and disturbance. Accordingly, the present disclosure is described to assist a determination system for assigning missions to a plurality of robots when there is an occurrence of an environment or event that is similar to what is learned with a generation of an AI model based on pre-made determination data of experts to assist people in making decisions. Further, with the present disclosure, in order to assist the determination system for assigning missions to a plurality of robots, a simulator may be generated that simulates a terrain of an operation area, a location and properties of the ally forces and the enemy forces, and experts' decisions (missions assigned to each robot) may be obtained when the above-descried situation is arrived, and a deep learning-based model may be produced based on the obtainments. In other words, during training, a model may be generated by obtaining a number of various images and information from a simulator and labeling a determination of an expert in the corresponding situation. At the time of reasoning, a mission to be assigned to each robot may be derived with only an image and information of a robot that are provided.

With regard thereto, the electronic device 100 may provide mission information. According to an example embodiment, the electronic device 100 may provide the mission information to each of the plurality of robots. According to another example embodiment, the electronic device 100 may provide the mission information to at least some of the plurality of robots or the outside. For example, the electronic device 100 may provide mission information to a first robot among the plurality of robots. According to an example embodiment, the first robot may indicate an ally forces' robot, and robots other than the first robot among the plurality of robots may indicate enemy forces' robots. According to an example embodiment, the first robot may include at least one robot. If the first robot includes at least one robot (for example, robot 1-1, robot 1-2, robot 1-3 and robot 1-4), the electronic device 100 may provide the mission information to each of robot 1-1, robot 1-2, robot 1-3 and robot 1-4.

FIG. 6 shows an example embodiment of attribute information of a plurality of robots, which is input information of a neural network.

According to an example embodiment, the processor 103 may generate attribute information of a plurality of robots. Specifically, the processor 103 may generate the attribute information of the plurality of robots by classifying attributes of the plurality of robots obtained by processing information about the plurality of robots for each robot. According to an example embodiment, the attribute information may include at least one of robot type information, information on robot movement direction, information on robot movement velocity, robot latitude information, robot longitude information, robot altitude information, information on robot movement distance, information on robot fuel rate, information on whether a robot is a friend or a foe, and information about a mission currently assigned to a robot.

Referring to FIG. 6, "image_array" is an index to identify the information about the attribute information "TA_7.png" file, and "current_date" and "current_time" are indexes that indicate date and time when the attribute information was generated as indicated by part 610.

In part 620 to part 650, "robot type" indicates the type of robot, "Heading" indicates the direction of movement based on true north (or geographic north) coordinates, "velocity (km/h)" indicates the movement velocity of the robot. "Position_North," "Position East" and "Position Elevation" are values collected from GPS, respectively, and indicate robot longitude information, latitude information and altitude information. According to an example embodiment, the processor 103 may process the robot longitude information, the latitude information and the altitude information according to predetermined criteria. "Mileage (km)" indicates information on robot movement distance, and "current_mission" indicates the index value of the current mission assigned to the robot (in other words, information about the mission currently assigned to the robot). In the case of "current mission" index value, it may be displayed as an "Action index" value as shown in Table 1 below.

TABLE 1

| Robot # | Robot 1 | Robot 2 | Robot 3 | Robot 4 | . . . |
|---|---|---|---|---|---|
| Action index | 0 (movement) | 1 (standby) | 2 (avoidance) | 0 (movement) | . . . |

Assigning mission to a plurality of robots refers to an algorithm that derives countermeasures for various contingency occurring while a robot is performing a mission on a battlefield. The countermeasures derived in this way correspond to a high-level action command (HLAC) in terms of robot control. For example, the HLAC may include movement, attack, avoidance and standby. The HLAC generated in this way generates a low-level control command (LLCC) to actually execute it. For example, if "movement" is given as the HLAC, the LLCC may generate and inform a route for "movement" using a GPS value. As a countermeasure, the HLAC may variabalize missions such as movement, attack and avoidance into indexes of values corresponding to the missions. Referring to Table 1, if the action index value is 0, it indicates that the currently assigned mission is "movement," if the action index value is 1, it indicates that the currently assigned mission is "standby," and if the action index value is 2, it indicates that the currently assigned mission is "avoidance." The mission assigned to each number in Table 1 is just an example embodiment, and other missions may be assigned to each number.

Referring back to FIG. 6, part 620 to part 650 in FIG. 6 represent attribute information of each robot. For example, referring to part 620 of FIG. 6 (attribute information of $0^{th}$ UGV), since the index "robot type" is "UGV_0," it indicates that the type of robot is a $0^{th}$ UGV. Since "Heading" is −0.621, it indicates that the $0^{th}$ UGV is −0.621 based on the true north or the geographic north. Since "velocity (km/h)" is 19.8, it indicates that the movement velocity of the $0^{th}$ UGV is 19.8 km/h. "Position North," "Position East" and "Position Elevation" are "3902036.150," "473154.110" and "147.570," respectively, and thus it indicates that the processed values of longitude, latitude and altitude of the GPS information of the $0^{th}$ UGV are "3902036.150," "473154.110" and "147.570." Since "Mileage (km)" is 89.7, it indicates that the movement distance that the $0^{th}$ UGV may move with the remaining fuel is 89.7 km. Since "current- _mission" is 1, it indicates that the mission currently assigned to the $0^{th}$ UGV is "movement." Similarly, part 630 in FIG. 6 indicates the attribute information of a first UGV. Part 640 indicates the attribute information of a second UGV. Part 650 indicates the attribute information of a $0^{th}$ UAV. The processor 103 may use the attribute information of the plurality of robots as well as image information on a terrain in a predetermined area as input information of the neural network, and thus improved mission assigning performance may be provided compared to the case of inputting only image information to the neural network.

Referring back to FIG. TA, according to an example embodiment, the processor 103 may generate image information about a terrain of a predetermined area. Specifically, the processor 103 may generate attribute information of a plurality of robots, and generate image information about the terrain of the predetermined area in which at least some of the attribute information of the plurality of robots is reflected. The processor 103 may use image information about the terrain as input information of a neural network together with the attribute information of the plurality of robots. Operations of generating the image information about the terrain of the predetermined area will be described in detail with reference to FIG. 7 below.

Figure 7:
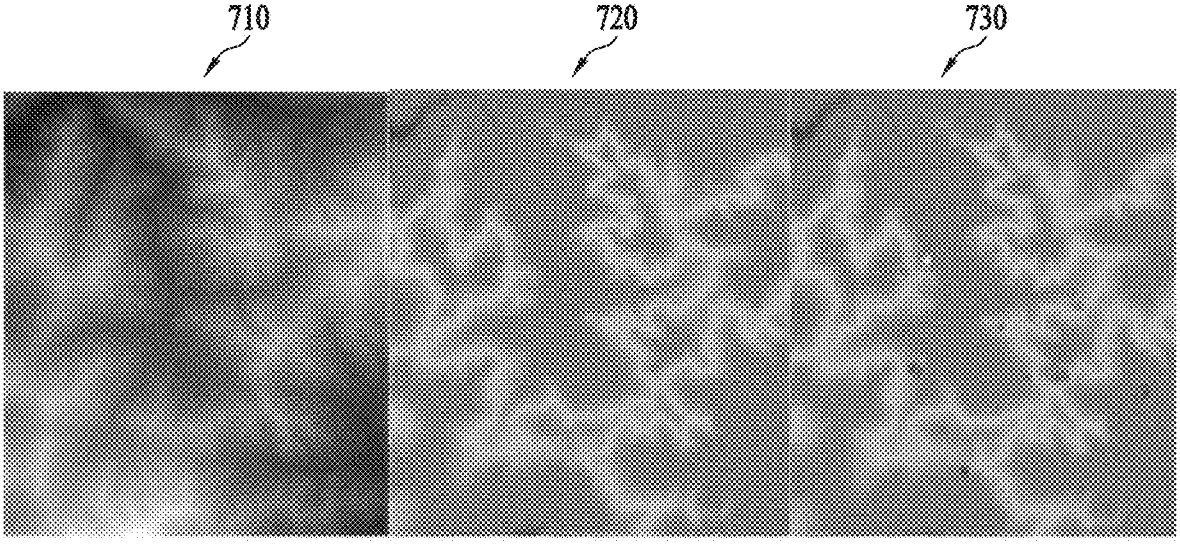
FIG. 7 illustrates image information about the terrain of a predetermined area, which is another input information of a neural network.

FIG. 7 illustrates image information about the terrain of a predetermined area, which is another input information of a neural network.

According to an example embodiment, the processor 103 may generate image information (for example, image information 710 of FIG. 7) visualizing a predetermined elevation of topography in gray scale. Specifically, the processor 103 may obtain the information about the terrain of the predetermined area based on location information about a plurality of robots that is obtained from a sensor mounted on a first robot, and the processor 103 may generate the image information 710 by visualizing the elevation of topography in grayscale. According to another example embodiment, the processor 103 may identify information about the terrain of the predetermined area based on the location information about the plurality of robots stored in the storage 102, and the processor 103 may generate the image information 710 by visualizing the elevation of topography of the predetermined area in gray scale. According to an example embodiment, the processor 103 may generate a heat map 720 in which the elevation of topography is visualized in a thermalgraphic image based on the image information 710 in which the predetermined elevation of the topography is visualized in grayscale. According to an example embodiment, the processor 103 may display icons on the heat map 720 to generate image information 730 about the terrain of the predetermined area. Operations of displaying the icons on the heat map 720 to generate the image information 730 about the terrain of the predetermined area will be described in detail with reference to FIG. 8 below.

Figure 8:
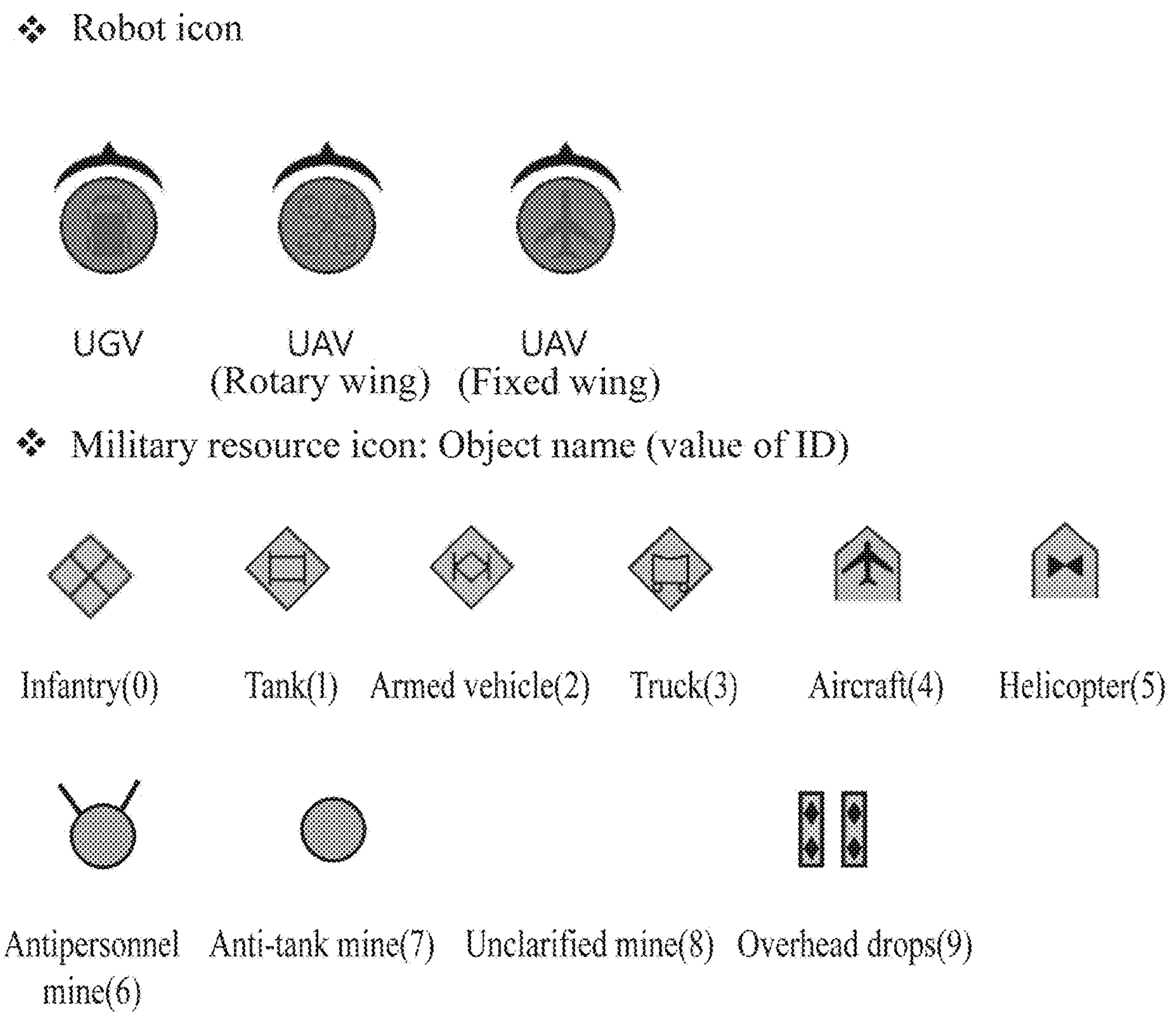
FIG. 8 shows examples of icon information.

FIG. 8 illustrates information about the icons.

According to an example embodiment, the processor 103 may identify informant about first icons representing attributes of a plurality of robots. Specifically, the processor 103 may identify information about the first icons representing attribute information of the plurality of robots based on at least some of the attribute information of the plurality of robots. For example, referring to FIG. 8, the processor 103 may identify a green UGV robot icon whose moving direction is north based on robot type information, information on whether a robot is a friend or a foe, and information on robot movement direction. Here, green may indicate an ally forces robot and red an enemy forces robot. The arrow at the top of the icon may indicate the moving direction of the robot. For another example, the processor 103 may identify a green UAV robot (with rotary wings) icon and a UAV robot (with fixed wings) icon of which moving direction is north, based on robot type information, information on whether a robot is a friend or a foe and information on robot movement direction. According to an example embodiment, the first icon includes at least one of the UGV icon, the UAV (with rotary wings) icon and the UAV (with fixed wings) icon, but it is not limited thereto. FIG. 8 illustrates that the first icons represent only information about the type of robot, whether the robot is a friend or a foe and the moving direction, but the first icons are not limited thereto. The first icon may represent other attribute information of a robot. For example, the processor 103 may identify information about the first icons based on robot type information, information on whether a robot is a friend or a foe, information on robot movement velocity and information about a current mission assigned to a robot. The type of robot may be displayed at the bottom of the first icon and whether a robot is a friend or a foe may be displayed in green or red. The robot's movement velocity and the currently assigned mission may be displayed as specific values on the left or right side of the icon.

According to another example embodiment, the processor 103 may identify information about a second icon representing a military resource. The processor 103 may obtain information about military resources. Here, the information about the military resource may include information about the type of military resource, information on whether a robot is a friend or a foe with regard to the military resource, information about the latitude of the military resource, information about the altitude of the military resource, information on the direction of movement of the military resource and information about the movement velocity of the military resource. For example, the processor 103 may obtain image information of military resources measured from a camera sensor mounted on the first robot, and the processor 103 may obtain information about the type of military resource and information on whether a robot is a friend or a foe with regard to the military resource by analyzing image information of the military resource through object recognition. The processor 103 may display an ally forces military resource in green and an enemy forces military resource in red when it is possible to distinguish whether the military resource is a fiend or a foe. However, as a result of the object recognition analysis, when neither the type of the military resource nor whether the military resource is a friend or a foe is clear, the processor 103 may identify the military resource as "Unclarified mine" in white. For another example, the processor 103 may obtain information about the latitude, longitude and altitude of the military resource based on GPS information of the military resource measured by a GPS sensor mounted on a separate detection robot.

The processor 103 may identify information about the second icon based on the obtained information about the military resource. According to an example embodiment, the second icon may include at least one of an infantry icon, a tank icon, an armed vehicle icon, a truck icon, an aircraft icon, a helicopter icon, an antipersonnel mine icon, an anti-tank mine icon, an unclarified mine icon, and an overhead drops icon. However, it is not limited thereto. Referring to FIG. 8, the processor 103 may identify a red antipersonnel mine icon based on information about the type of military resource and information on whether a robot is a friend or a foe with regard to the military resource. For another example embodiment, the processor 103 may identify a red overhead drops icon based on information about the type of military resource and information on whether a robot is a friend or a foe with regard to the military resource. Referring to FIG. 8, an icon related to a military resource may be replaced with a separate object name (an ID value) and displayed on a heat map (for example, the image information 730 of FIG. 7). For example, an infantry icon may be displayed on the heat map as "0" and an aircraft may be marked on the heat map as "4." In FIG. 8, the second icon is displayed as indicating only information about the type of military resource and whether a robot or an object is a friend or a foe, but it is not limited thereto. The second icon may represent other information of military resource. For example, the processor 103 may identify a red infantry icon based on information about the type of military resource, information on whether a robot is a friend or a foe with regard to the military resource, information on the direction of movement of the military resource and information about the movement velocity of the military resource. The type of military resource may be displayed at the bottom of the second icon, whether the military resource is a friend or a foe may be displayed in green or red, the movement direction and movement velocity of the military resource may be displayed as specific values on the left or right.

Referring back to FIG. 7, according to an example embodiment, the processor 103 may generate image information 730 about the terrain of the predetermined area by displaying the first icon indicating the properties of a plurality of robots on at least a partial area of the heat map 720. In another example embodiment, the processor 103 may display a second icon representing a military resource on at least a partial area on the heat map 720 to generate the image information 730 about the terrain of the predetermined area. In other words, the processor 103 may generate the image information 730 about the terrain of the predetermined area by displaying at least one of the first icon and the second on a partial area of the heat map 720 corresponding to the location information of each robot or on a partial area of the heat map 720 corresponding to the location information of each military resource.

When an icon is displayed to generate the image information 730 about the terrain of the predetermined area, accuracy of the image information may be degraded due to overlap of icons. The image information about the terrain of the predetermined area is used as input information of the neural network, and as a result, it may lead to a decrease in mission assigning performance. In order to prevent this, according to an example embodiment, when the icons of the first robot and the second robot overlap, the processor 103 may generate the image information about the terrain of the predetermined area by reducing the size of at least one of the icons of the first robot and the second robot. According to another example embodiment, when an overlap between the first icon and the second icon occurs, the processor 103 may reduce the size of at least one of the first icon and the second icon to generate the image information about the terrain of the predetermined area. For example, in the image information 730 of FIG. 7, since an overlap occurs between the first icon and the second icon, the processor 103 may generate the image information about the terrain of the predetermined area by reducing the size of the first icon, reducing the size of the second icon, or reducing both the sizes of the first icon and the second icon. The processor 103 may provide improved mission assigning performance by improving the accuracy of neural network input information by preventing icons from overlapping on the image information about the terrain of the predetermined area.

Referring back to FIG. 1A, the processor 103 may identify mission information for assigning a mission to a first robot among a plurality of robots. Specifically, the processor 103 may identify mission information output from a neural network into which attribute information of the plurality of robots and the image information about the terrain of the predetermined area are input. According to an example embodiment, the neural network may be a trained convolutional neural network, and the processor 103 may train the neural network. The operation of training the neural network will be described in detail with FIG. 9 below.

Figure 9:
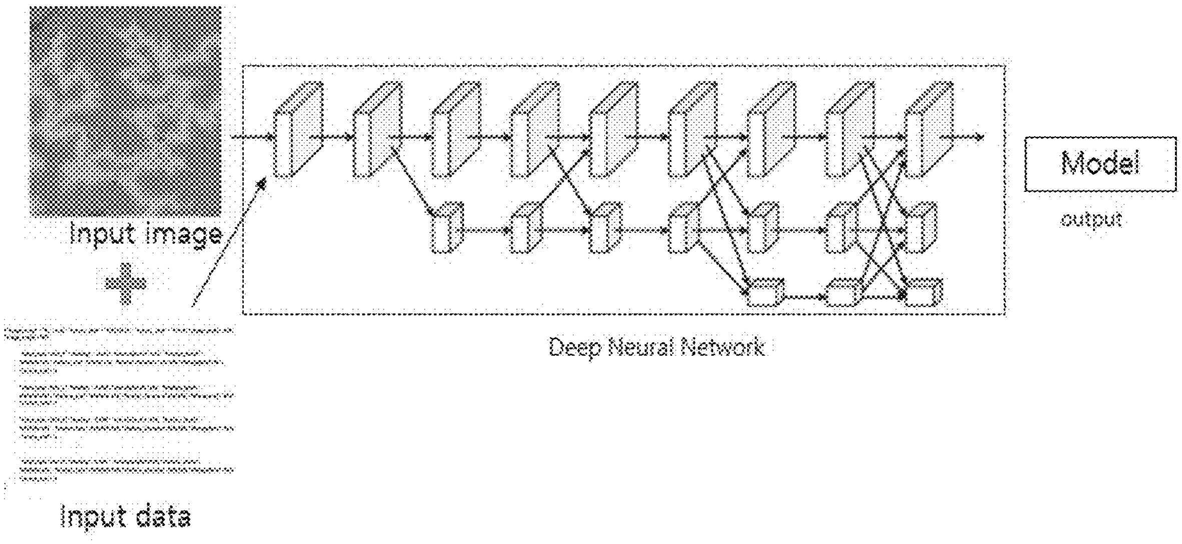
FIG. 9 shows an example embodiment of training a neural network.

FIG. 9 shows an example embodiment of training a neural network.

According to an example embodiment, to improve mission assigning performance, when attribute information (for example, the attribute information of FIG. 6) of a plurality of robots and image information (for example, the image information 730 of FIG. 7) on a terrain of a predetermined area are provided as input information, the processor 103 may derive a model by learning or training through a deep-learning CNN technique based on label data. Further, when a new unlearned input information is provided to the processor 103, a mission may be assigned based on a pre-learned or trained model. As a method of assigning missions through learning (based on the CNN deep learning), the method of pairing input information with an answer that is correct thereto is mainly used. In order to implement this, the processor 103 may derive a model by training a neural network by designating a mission assigning result assigned by an expert as an answer sheet. When information similar to the data learned by using the CNN-based learning model is input, the processor 103 may perform relatively fast inference with little variation in deriving time. Further, since the CNN-based learning model may use 2D RGB-based images as input data, object recognition state-of-the-art (SOTA), which is widely used in the art, may also be applied.

According to an example embodiment, the processor 103 may identify mission information that is output from the neural network into which attribute information of a plurality of robots and image information about the terrain of the predetermined area are input. The neural network may be trained to infer mission information for assigning a mission to a first robot among the plurality of robots. In other words, the neural network may be a convolutional neural network trained to output mission information for assigning a mission to the first robot based on the attribute information of the plurality of robots in a specific area and the image information about the terrain of the specific area to which at least some of the attribute information of the plurality of robots is reflected.

According to an example embodiment, the processor 103 may train the neural network. Specifically, as input information for the neural network, the processor 103 may obtain the attribute information of the plurality of robots in each of a plurality of areas and image information on the terrain of each of the plurality of areas reflecting at least some of the attribute information of the plurality of robots in each of the plurality of areas. Further, the processor 103 may obtain mission information for assigning a mission to the first robot in each of the plurality of areas as target information for input information of the neural network. The processor 103 may train the neural network based on the obtained input information and the target information. The processor 103 may identify mission information using the trained neural network, and provide the identified mission information to the first robot or to the plurality of robots.

Figure 10:
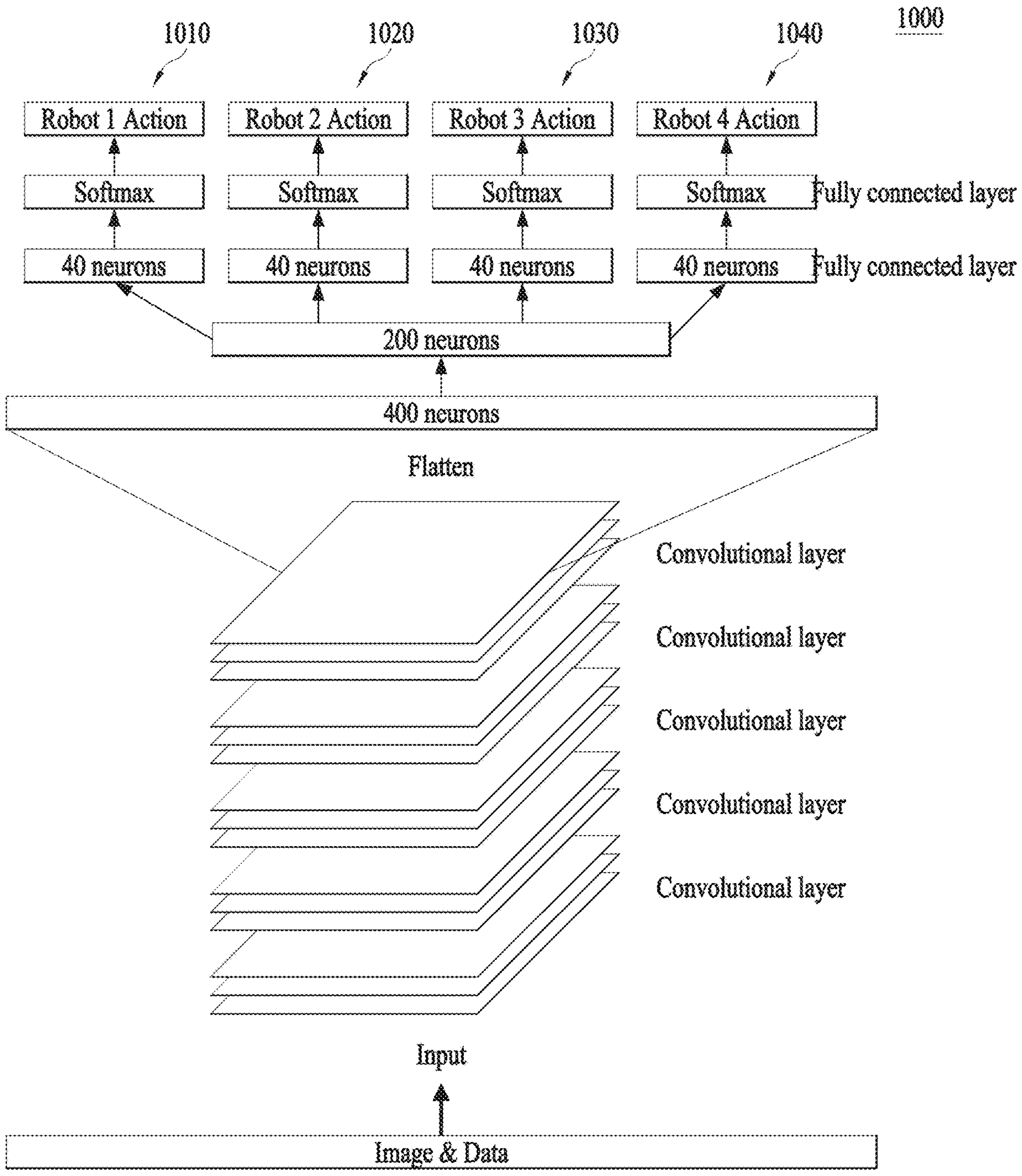
FIG. 10 shows a convolutional neural network as an example embodiment of a neural network.

FIG. 10 shows a convolutional neural network as an example embodiment of a neural network.

As illustrated in FIG. 10, a convolutional neural network 1000 may be composed of convolutional layers, fully connected layers and a softmax layer. According to an example embodiment, the convolutional neural network 1000 may be composed of 5 convolution layers, 2 fully connected layers and a softmax layer. According to an example embodiment, the convolutional neural network 1000 may be a convolutional neural network trained to output mission information for assigning a mission to the first robot based on the attribute information of the plurality of robots in a specific area and the image information about the terrain of the specific area to which at least some of the attribute information of the plurality of robots in the specific area is reflected. The convolutional neural network 1000 may use a flatten function. Here, the flatten function may refer to a function that changes the shape of data (tensors). For example, the flatten function may covert 200×200×1 data into 40000×1 data.

According to an example embodiment, when the first robot includes at least one robot (robot 1-1, robot 1-2, robot 1-3 and robot 1-4), the convolutional neural network 1000 in which the attribute information of the plurality of robots and the image information about the terrain of the predetermined area are input may output candidate mission values for identifying information on mission to be assigned to at least one robot through each of the 40 neurons. Among the 40 candidate mission values, the processor 103 may identify the candidate mission value having the highest output value of the softmax layer as a first mission value 1010, a second mission value 1020, a third mission value 1030 and a fourth mission value 1040. In other words, the processor 103 may identify the first mission value 1010, the second mission value 1020, the third mission value 1030 and the fourth mission value 1040 as first mission information, second mission information, third mission information and fourth mission information for assigning a mission to each robot (for example, robot 1-1, robot 1-2, robot 1-3 and robot 1-4). The processor 103 may provide the first mission information to robot 1-1, the second mission information to robot 1-2, the third mission information to robot 1-3 and the fourth mission information to robot 1-4.

Figure 11:
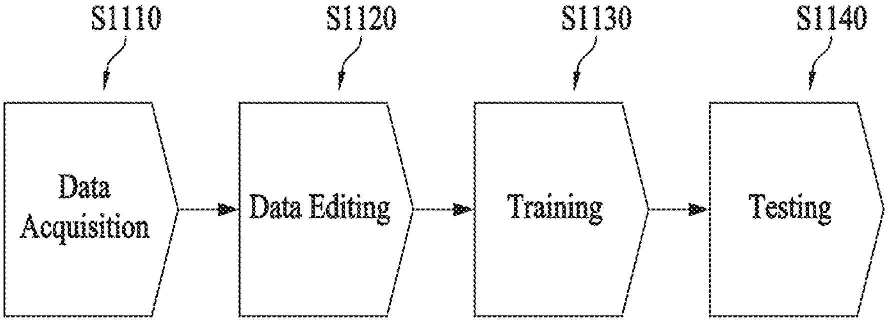
FIG. 11 illustrates a method of operating an electronic device according to an example embodiment.

FIG. 11 illustrates a method of operating an electronic device according to an example embodiment.

In operation S1110 for data acquisition, the electronic device 100 may obtain sensed information of a plurality of robots. According to an example embodiment, the electronic device 100 may obtain sensed information of the plurality of robots from a sensor mounted on the first robot or from a sensor mounted on a separate detection robot. According to another example embodiment, the electronic device 100 may obtain sensed information of the plurality of robots stored in the storage 102. The electronic device 100 may generate attribute information of the plurality of robots based on the obtained sensed information of the plurality of robots, and the electronic device 100 may generate image information about the terrain of the predetermined area in which at least some of the attribute information of the plurality of robots is reflected.

In operation S1120 for data editing, the electronic device 100 may edit the data obtained in operation S110 to remove parts unnecessary for learning of the neural network. For example, when the attribute information of the plurality of robots or the image information about the terrain of the predetermined area already obtained to learn or train the neural network is duplicated due to a simple human error, the electronic device 100 may remove the redundant data.

In operation S1130 for training, the electronic device 100 may train the neural network based on the data edited in operation S1120. Specifically, the electronic device 100 may train or learn the neural network through the attribute information of the plurality of robots, the image information about the terrain of the predetermined area as input information, and the expert's mission in formation, which is the output of the neural network and is the label.

In operation S1140 for testing, the electronic device 100 may identify mission information for assigning a mission to the first robot among the plurality of robots by using the neural network learned or trained in operation S1130.

According to an example embodiment, the electronic device 100 may provide the mission information. The electronic device 100 may transmit mission information to the first robot through a communication device or output the mission information on a display.

Figure 12:
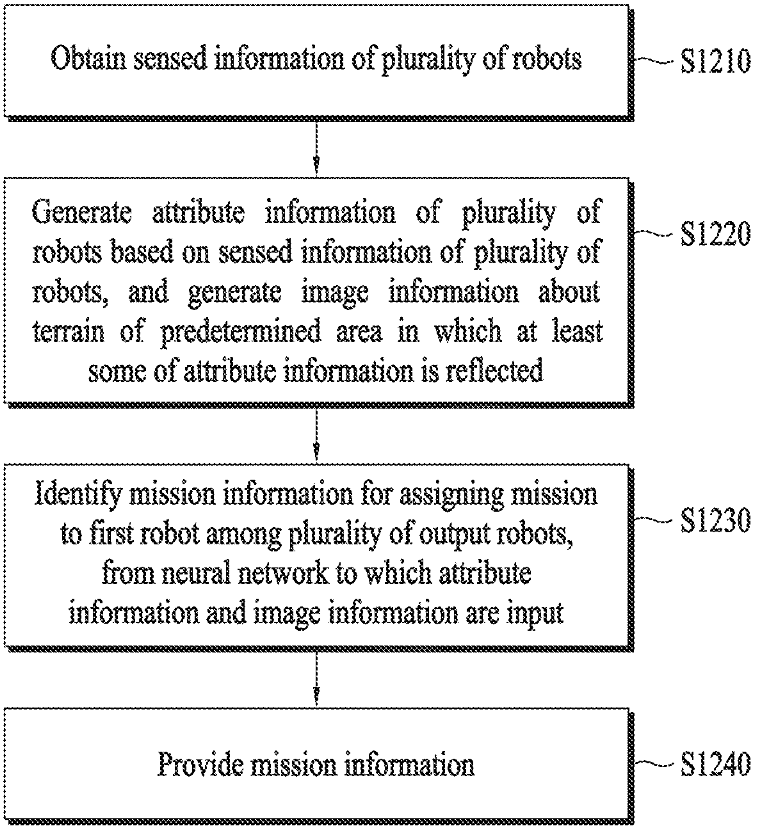
FIG. 12 illustrates a method of operating an electronic device according to another example embodiment.

FIG. 12 illustrates a method of operating an electronic device according to another example embodiment.

Each operation of an operation method of FIG. 12 may be performed by the electronic device 100 of FIG. 1A, and thus descriptions of overlapping contents with the descriptions with respect to FIGS. 1A to 11 are omitted.

In operation S1210, the electronic device may obtain sensed information of a plurality of robots. The sensed information of the plurality of robots may be obtained from a sensor mounted on the first robot or from a sensor mounted on a separate detection robot. The sensor mounted on the first robot may include at least one of a camera sensor, a direction detecting sensor, an accelerometer sensor, a gyro sensor, a GPS sensor, an altitude sensor and a fuel sensor.

In operation S1220, the electronic device may generate attribute information of the plurality of robots based on the sensed information of the plurality of robots, and may generate image information about a terrain of a predetermined area in which at least some of the attribute information is reflected. The attribute information may include at least one of robot type information, information on robot movement direction, information on robot movement velocity, robot latitude information, robot longitude information, robot altitude information, information on robot movement distance, information about robot fuel rate, information on whether a robot is a friend or a foe and information about the current mission assigned to a robot. The image information about the terrain of the predetermined area may be generated by displaying a first icon or a second icon on at least a part of the heat map information in which the elevation of topography of the predetermined area corresponding to the location information of each robot is visualized in a thermal-graphic image.

In operation S1230, the electronic device may identify mission information for assigning a mission to a first robot among the plurality of output robots, from the neural network to which the attribute information and the image information are input. The electronic device may train the neural network, and may identify mission information using the trained neural network.

In operation S1240, the electronic device may provide the mission information. The electronic device may provide the mission information to the first robot among the plurality of robots or may provide the mission information to the outside.

Meanwhile, in the present disclosure and drawings, example embodiments are disclosed, and certain terms are used. However, the terms are only used in general sense to easily describe the technical content of the present disclosure and to help the understanding of the present disclosure, but not to limit the scope of the present disclosure. It is apparent to those of ordinary skill in the art to which the present disclosure pertains that other modifications based on the technical spirit of the present disclosure may be implemented in addition to the example embodiments disclosed herein.

The electronic device or a terminal according to the above-described example embodiments may include a processor, a memory for storing and executing program data, a permanent storage such as a disk drive, and/or a user interface device such as a communication port, a touch panel, a key and/or an icon that communicates with an external device. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processer.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control devices. Similar to that elements may be implemented as software programming or software elements, the example embodiments may be implemented in a programming or scripting language such as C, C++, Java, assembler, Python, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means" and "configuration" may be used broadly and are not limited to mechanical and physical elements. The terms may include the meaning of a series of routines of software in association with a processor or the like.

It will be apparent to those skilled in the art that various modifications and variations can be made in the present disclosure without departing from the spirit or scope of the invention. Thus, it is intended that the present disclosure cover the modifications and variations of the embodiments of the invention provided they come within the scope of the appended claims and their equivalents.

What is claimed is:

1. A method of determining a mission of a device in an electronic device, the method comprising:

receiving, at a transceiver, external situation information and status information of a plurality of devices in response to an external situation that occurred externally;

identifying, at a processor, an object function related to a degree of fitness of a device for a mission;

for each set of a plurality of solutions of a first generation for the plurality of devices, calculating a value of the object function using the external situation information and the status information;

based on the value, determining a set of a plurality of solutions of a next generation for the plurality of devices through a genetic algorithm (GA);

based on a first solution from a set of a plurality of solutions of a second generation by repeating the calculating the value and the determining the set of the plurality of solutions of the next generation, determining a mission for the plurality of devices; and transmitting, via the transceiver, a mission command to each of the plurality of devices, wherein the mission command specifies, for each device, an operation scenario corresponding to the determined mission, the operation scenario comprising one of the operation scenarios of an avoidance scenario or the operation scenarios of a destruction scenario, wherein each device executes the operation scenario upon receiving the mission command, wherein the external situation information indicates at least one of detection of an enemy force and detection of a natural disaster, wherein the status information includes at least one of information on oil status of the plurality of devices, and information on charging status of the plurality of devices, wherein the set of the plurality of solutions of the first generation include a solution corresponding to the avoidance scenario and a solution corresponding to the destruction scenario, the set of the plurality of solutions of the second generation include at least one of the solution corresponding to the avoidance scenario and the solution corresponding to the destruction scenario, wherein the solution corresponding to the avoidance scenario includes an operation scenario of each of the plurality of devices including rear separation operation, bypass operation and rapid operation, wherein the solution corresponding to the destruction scenario includes an operation scenario of each of the plurality of devices including attack operation, reconnaissance operation and standby operation, wherein the calculating the value of the object function includes:

identifying a plurality of response scenarios related to the external situation information;

based on a predetermined rule, calculating a plurality of degrees of fitness for the plurality of response scenarios; and based on a plurality of weights related to the plurality of response scenarios and the plurality of degrees of fitness, calculating the value of the object function, wherein the calculating the plurality of degrees of fitness for the plurality of response scenarios includes calculating a degree of fitness for a first response scenario among the plurality of response scenarios, which includes:

based on at least one of the external situation information and the status information, identifying whether a plurality of conditions corresponding to the first response scenario are satisfied;

based on whether the plurality of conditions are satisfied, determining a first value for the plurality of conditions; and based on a plurality of first weights related to the plurality of conditions and the first value, calculating the degree of fitness for the first response scenario.

2. The method of claim 1, wherein the calculating the value of the object function based on the plurality of weights and the plurality of degrees of fitness includes, for each of the plurality of response scenarios, by performing a calculation of a function that is set based on a degree of fitness and a weight corresponding to a response scenario, determining a second value among result values of the calculation as the value of the object function.

3. The method of claim 1, wherein the set of the plurality of solutions of the first generation includes an index that is arbitrarily determined.

4. The method of claim 1, wherein the determining the set of the plurality of solutions of the next generation includes, determining the set of the plurality of solutions of the next generation based on at least one of selection, crossover and mutation that are related to the GA.

5. The method of claim 1, wherein the first solution is determined based on a frequency of the plurality of solutions of the second generation.

6. The method of claim 1, wherein the first solution is determined based on a value of the object function for each set of the plurality of solutions of the second generation.

7. The method of claim 2, wherein the determining the mission for the plurality of devices based on the first solution includes:

based on the value of the object function corresponding to the first solution, identifying a second response scenario among the plurality of response scenarios; and identifying a mission for the plurality of devices corresponding to the second response scenario by using the first solution as an index.

8. An electronic device of determining a mission of a device, comprising:

a transceiver;

a storage configured to store at least one instruction; and wherein the processor is configured to:

receive, at the transceiver, external situation information and status information of a plurality of devices in response to an external situation that occurred externally;

identify, at the processor, an object function related to a degree of fitness of a device for a mission;

for each set of a plurality of solutions of a first generation for the plurality of devices, calculate a value of the object function using the external situation information and the status information;

based on the value, determine a set of a plurality of solutions of a next generation for the plurality of devices through a GA;

based on a first solution from a set of a plurality of solutions of a second generation by repeating the calculating the value and the determining the set of the plurality of solutions of the next generation, determine a mission for the plurality of devices; and transmit, via the transceiver, a mission command to each of the plurality of devices, wherein the mission command specifies, for each device, an operation scenario corresponding to the determined mission, the operation scenario comprising one of the operation scenarios of an avoidance scenario or the operation scenarios of a destruction scenario, wherein each device executes the operation scenario upon receiving the mission command, wherein the external situation information indicates at least one of detection of an enemy force and detection of a natural disaster, wherein the status information includes at least one of information on oil status of the plurality of devices, and information on charging status of the plurality of devices, wherein the set of the plurality of solutions of the first generation include a solution corresponding to the avoidance scenario and a solution corresponding to the destruction scenario, the set of the plurality of solutions of the second generation include at least one of the solution corresponding to the avoidance scenario and the solution corresponding to the destruction scenario, wherein the solution corresponding to the avoidance scenario includes an operation scenario of each of the plurality of devices including rear separation operation, bypass operation and rapid operation, wherein the solution corresponding to the destruction scenario includes an operation scenario of each of the plurality of devices including attack operation, reconnaissance operation and standby operation, wherein the processor is configured to:

identify a plurality of response scenarios related to the external situation information, based on a predetermined rule, calculate a plurality of degrees of fitness for the plurality of response scenarios, and based on a plurality of weights related to the plurality of response scenarios and the plurality of degrees of fitness, calculate the value of the object function, wherein the calculating the plurality of degrees of fitness for the plurality of response scenarios includes calculating a degree of fitness for a first response scenario among the plurality of response scenarios, the processor is configured to:

based on at least one of the external situation information and the status information, identifying whether a plurality of conditions corresponding to a first response scenario are satisfied;

based on whether the plurality of conditions are satisfied, determining a first value for the plurality of conditions; and based on a plurality of first weights related to the plurality of conditions and the first value, calculating the degree of fitness for the first response scenario.

9. A computer-readable non-transitory recording medium having a program for executing a method for determining a mission of a device on a computer, wherein the program has instructions for:

receiving, at a transceiver, external situation information and status information of a plurality of devices in response to an external situation that occurred externally;

identifying, at a processor, an object function related to a degree of fitness of a device for a mission;

for each set of a plurality of solutions of a first generation for the plurality of devices, calculating a value of the object function using the external situation information and the status information;

based on the value, determining a set of a plurality of solutions of a next generation for the plurality of devices through a GA;

based on a first solution from a set of a plurality of solutions of a second generation by repeating the calculating the value and the determining the set of the plurality of solutions of the next generation, determining a mission for the plurality of devices;

transmitting, via the transceiver, a mission command to each of the plurality of devices, wherein the mission command specifies, for each device, an operation scenario corresponding to the determined mission, the operation scenario comprising one of the operation scenarios of an avoidance scenario or the operation scenarios of a destruction scenario, wherein each device executes the operation scenario upon receiving the mission command, wherein the external situation information indicates at least one of detection of an enemy force and detection of a natural disaster, wherein the status information includes at least one of information on oil status of the plurality of devices, and information on charging status of the plurality of devices wherein the set of the plurality of solutions of the first generation include a solution corresponding to the avoidance scenario and a solution corresponding to the destruction scenario, the set of the plurality of solutions of the second generation include at least one of the solution corresponding to the avoidance scenario and the solution corresponding to the destruction scenario, wherein the solution corresponding to the avoidance scenario includes an operation scenario of each of the plurality of devices including rear separation operation, bypass operation and rapid operation, wherein the solution corresponding to the destruction scenario includes an operation scenario of each of the plurality of devices including attack operation, reconnaissance operation and standby operation, wherein the calculating the value of the object function includes:

identifying a plurality of response scenarios related to the external situation information;

based on a predetermined rule, calculating a plurality of degrees of fitness for the plurality of response scenarios; and based on a plurality of weights related to the plurality of response scenarios and the plurality of degrees of fitness, calculating the value of the object function, wherein the calculating the plurality of degrees of fitness for the plurality of response scenarios includes calculating a degree of fitness for a first response scenario among the plurality of response scenarios, which includes:

based on at least one of the external situation information and the status information, identifying whether a plurality of conditions corresponding to the first response scenario are satisfied;

based on whether the plurality of conditions are satisfied, determining a first value for the plurality of conditions; and based on a plurality of first weights related to the plurality of conditions and the first value, calculating the degree of fitness for the first response scenario.

* * * * *